June 4, 1957 R. R. WAREHAM 2,794,378
PHOTOGRAPHIC APPARATUS

Filed Nov. 4, 1954 4 Sheets-Sheet 1

INVENTOR
Richard R. Wareham
BY Brown and McKulka
ATTORNEY

June 4, 1957

R. R. WAREHAM 2,794,378

PHOTOGRAPHIC APPARATUS

Filed Nov. 4, 1954

INVENTOR
Richard R. Wareham

BY Brown and Mikulka

ATTORNEYS

June 4, 1957 R. R. WAREHAM 2,794,378
PHOTOGRAPHIC APPARATUS
Filed Nov. 4, 1954 4 Sheets-Sheet 4

INVENTOR
Richard R. Wareham
BY Brown and Mikulka
ATTORNEYS

:::: {.columns}
::: {.column}
United States Patent Office 2,794,378

PHOTOGRAPHIC APPARATUS

Richard R. Wareham, Marblehead, Mass., assignor to Polaroid Corporation, Cambridge, Mass., a corporation of Delaware Application November 4, 1954, Serial No. 466,734

53 Claims. (Cl. 95—13)

This invention relates to photography and more particularly to novel photographic apparatus for exposing and thereafter processing a photosensitive sheet by superposing said sheet on another sheet and spreading a processing composition between said sheets.

Objects of the present invention are: to provide a simple, inexpensive camera of the self-developing type comprising a housing mounting lens and shutter means and defining a path through which a photosensitive sheet is adapted to be advanced, a removable magazine within said housing including means for mounting supplies of said photosensitive sheet and a second sheet and for positioning said photosensitive sheet for exposure, and a wall dividing said housing into a lighttight exposure chamber in which said photosensitive sheet is exposed and a processing chamber into which said sheets are advanced during processing; to provide a camera of the above type including a first pressure-applying member mounted on said magazine, a second pressure-applying member and novel means within said housing for mounting said second pressure-applying member and retaining said pressure-applying members in juxtaposition when said magazine is in operative position within said housing; to provide a camera of the above type wherein said housing includes an opening in one side through which said magazine may be removed, said magazine including a wall providing a closure for said opening and a dependent wall dividing said housing into said two chambers, a first pressure-applying roller pivotally mounted on said dependent wall and a novel device secured within said housing comprising means for pivotally mounting a second pressure-applying roller, means for engaging said first pressure-applying roller and retaining the latter in juxtaposition with said second pressure-applying roller when said magazine is operatively positioned within said housing, and means for urging said second pressure-applying roller toward said first pressure-applying roller; to provide a device of the above type including means for mounting novel stop means adapted to arrest the movement of said sheets through said camera; to provide a novel stop means comprising a single element and adapted to cooperate with a portion of said magazine to arrest the movement of said sheets through said camera and means for controlling the operation of said stop means; and to provide a stop means of the above type comprising a single spring having at least one end so positioned as to engage portions of said photosensitive sheet to arrest the advancement of said sheet, and means for deactuating said stop means.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following
:::
::: {.column}
detailed description taken in connection with the accompanying drawings wherein.

Figure 1:
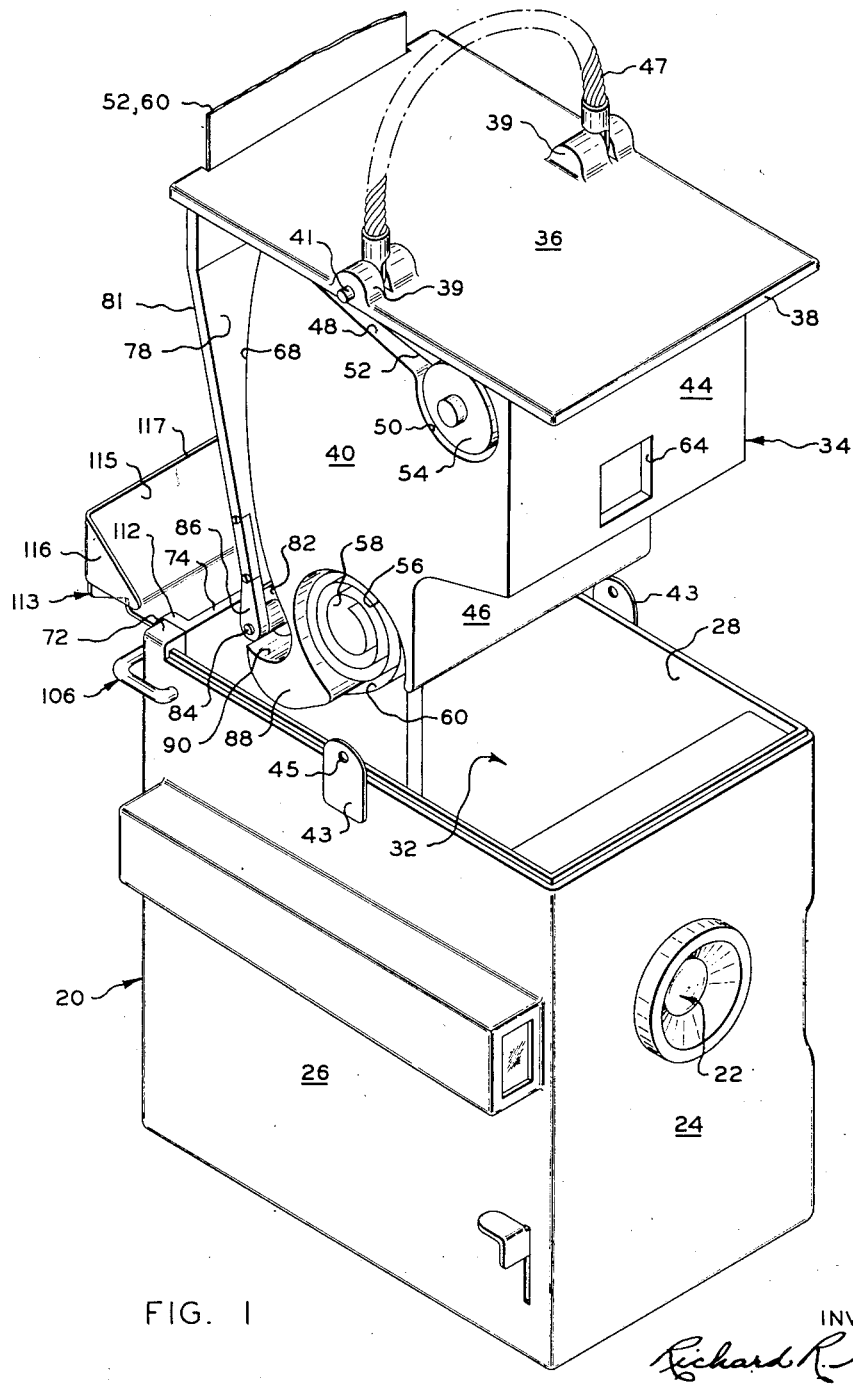
Figure 1 is a perspective view of a camera embodying the present invention showing the magazine with the photosensitive and second sheets loaded therein just prior to positioning within the housing.

Photographic apparatus of the type herein illustrated generally includes means for processing an exposed photosensitive sheet by superposing said photosensitive sheet on another sheet and spreading a thin layer of processing composition between said sheets. The photosensitive sheet includes a layer of photosensitive material, preferably an emulsion of silver halide in which a latent image may be attained by differential exposure to actinic light cast on a suitable support or backing. The second sheet is adapted to serve as a support for an image-receptive layer in which a visible print of a latent image in the photosensitive layer may be produced. The processing composition, when spread in a uniformly thin layer between the photosensitive and second sheets, preferably effectuates a silver halide diffusion transfer-reversal process by which a latent image in the photosensitive sheet is developed and a positive print is produced in the second sheet. Examples of photographic materials useful in processes of the foregoing type are described in detail in U. S. Patent No. 2,543,181, issued to Edwin H. Land on February 27, 1951. It is of course to be understood that the apparatus herein described is not limited to use with any particular species of photosensitive or second sheets, the terms "photosensitive" and second sheet" being used in their broadest sense to indicate a first sheet which is photosensitive and a second sheet which merely may aid in spreading the processing composition over the surface of the photosensitive sheet and which may, if desired, possess other characteristics.

The herein disclosed invention is illustrated in the accompanying drawings embodied in a handheld camera of the self-developing type. Generally the camera includes an exposure chamber in which successive portions or frames of a photosensitive sheet may be successively positioned for exposure to actinic light, and a processing chamber into which said portions are advanced during processing. At the entrance to the processing chamber there is provided a pair of pressure-applying rollers adapted to receive therebetween a photosensitive sheet from the exposure chamber and to superpose said sheet with a second sheet. The second sheet has on one of its surfaces a succession of image-receiving areas registrable with said frames and has affixed thereto a succession of
:::
::::

containers of the processing composition, one container being associated with each image-receiving area. As the sheets are advanced in superposed relation between the pressure-applying rollers, processing composition is ejected from a container and spread in a thin layer between a frame of the photosensitive sheet and an image-receiving area of the second sheet, thereby forming a sandwich which advances into the processing chamber. Stop means are provided for arresting advancement of the sandwich when one frame and the image-receiving area with which it is registered have advanced entirely between the rollers into the processing chamber. The aforementioned frame and area are allowed to remain within the processing chamber for a predetermined period, during which a positive print is formed in the image-receiving area with which said frame is superposed. At the end of the predetermined processing period the processing chamber may be opened and the developed positive print may be removed.

Figure 2:
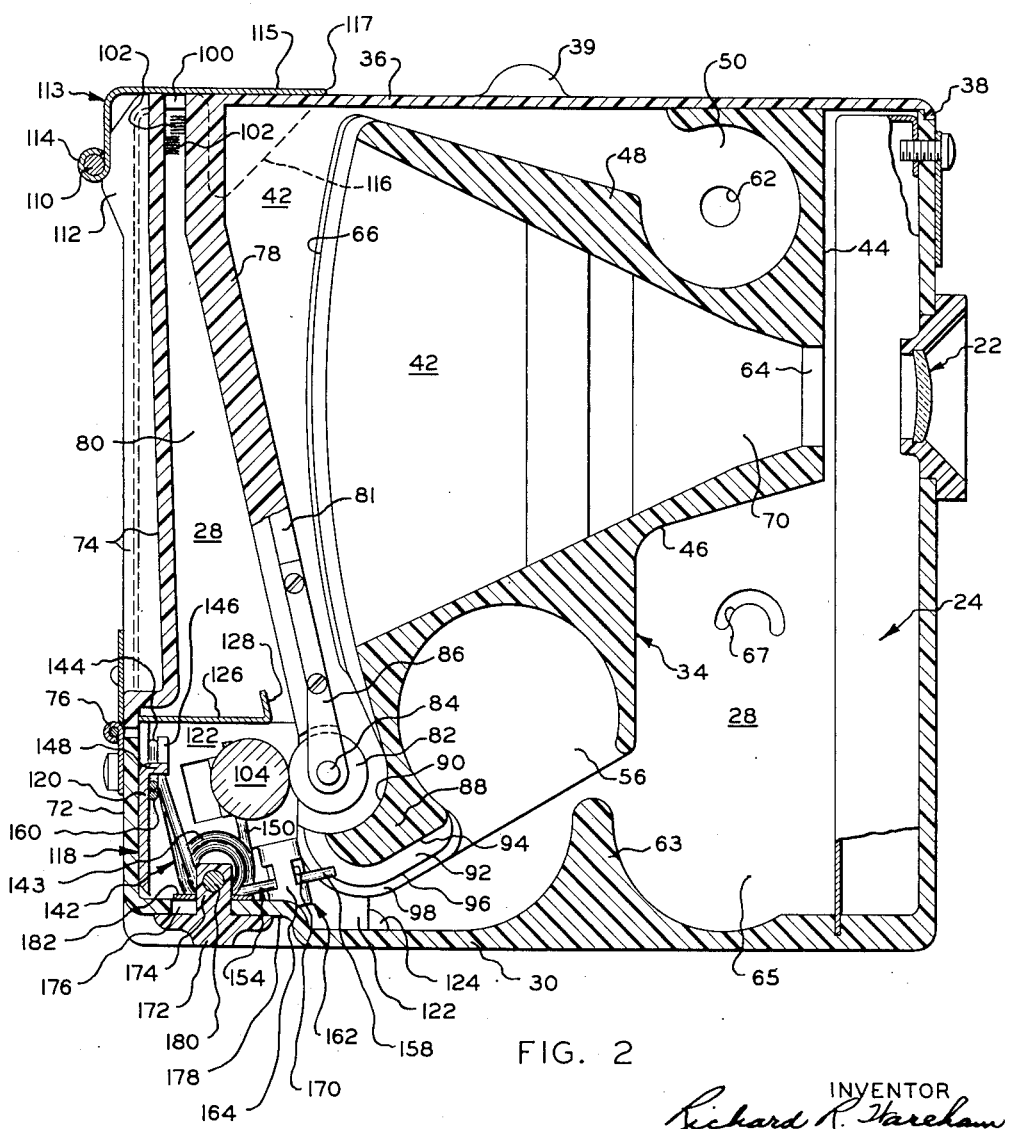
Fig. 2 is a sectional view through the housing with the magazine in operative position.

Referring now to the drawings, wherein like numerals denote like parts, there is shown in Figs. 1 and 2 a simple inexpensive camera of the so-called "box" type embodying the present invention. The camera includes a housing 20 having a forward portion which mounts a lens 22, preferably of fixed focus, and a shutter 24 of conventional design which may include suitable means for actuating the shutter, varying its speed, setting the shutter for instantaneous or bulb exposure, and the like. Housing 20 includes side walls 26 and 28 and a bottom wall 30, while the upper portion of the housing is provided with a passage 32 through which a magazine 34 may be positioned within housing 20. As a closure for passage 32, magazine 34 includes an upper wall 36 having flanges 38 adapted to be snugly seated on the edges of the housing wall when said magazine is in proper operative position within housing 20 to render said housing lighttight. To retain magazine 34 in position within housing 20, upper wall 36 is provided with a pair of raised bosses 39 adjacent its edges with pins 41 secured in and extending laterally from said bosses. Deformable retaining elements 43 having openings 45 adapted to engage pins 41 are secured to side walls 26 and 28 of housing 20. Additionally, bosses 39 and pins 41 provide convenient means for attaching a carrying strap 47 to the camera.

Magazine 34 includes, in addition to upper wall 36, two dependent side walls 40 and 42, a relatively short dependent front wall 44, a lower wall 46 joining said side walls 40 and 42, and an intermediate wall 48 joining side walls 40 and 42 and spaced between upper wall 36 and lower wall 46. Intermediate wall 48 is so formed as to provide a rounded compartment 50 in which a supply of photosensitive sheet 52 rolled on a conventional spool 54 may be positioned and carried by magazine 34. A lower wall 46 is so formed as to provide another rounded compartment 56 substantially larger in cross section than compartment 50, in order to retain the greater bulk of a roll 58 of a second sheet 60. Side wall 42 provides closed ends for compartments 50 and 56 and includes a round opening 62 in compartment 50 in which a stub shaft on the end of spool 54 may be journaled, the curvature of wall 48 comprising chamber 50 serving to retain spool 54 in said compartment. Roll 58 of second sheet 60 is retained in compartment 56 by the curvature of wall 46 comprising that compartment, and bottom wall 30 of housing 20 is provided with an upward extending member 63 adapted to cooperate with bottom wall 46 of magazine 34 to retain roll 58 in compartment 56 when magazine 34 is operatively positioned within housing 20. In addition, element 63, together with bottom wall 30 of housing 20, cooperate with lower wall 46 of magazine 34 to provide another compartment 65 in which an extra roll of photosensitive sheet and a roll of the second sheet may be conveniently carried and stored until required. Curved bosses 67 may be provided on walls 26 and 28 in compartment 65 and are adapted to engage the stub shafts on the ends of a spool 54 to retain the latter in housing 20.

Forward wall 44 is provided with an aperture 64 so positioned as to be aligned with the exposure aperture of lens 22 and shutter 24 when magazine 34 is in proper operative position within housing 20. Lower wall 46 and intermediate wall 48 are divergent from said forward wall 44 and define in conjunction with side walls 40 and 42 a chamber or passage 70 which is open at its narrow forward end (aperture 64) and at its rear end to provide, when magazine 34 is in proper operating position within housing 20, an optical path between lens 22 and the focal surface of said lens. The rear edge portion of side wall 40 is curved so as to provide a guide surface (not shown) in the focal surface of lens 22 when magazine 34 is in proper operative position within housing 20. Side wall 42 is provided with a curved shoulder providing a guide surface, indicated at 66, in the focal plane of lens 22. Photosensitive sheet 52 extends from compartment 50 between upper wall 36 and intermediate wall 48 and is adapted to be positioned for exposure across the rear end of passage 70 with a frame of photosensitive sheet 52 supported in exposure position across said passage at its margins on guide surface 66. The edge portion of wall 40 is provided with a shoulder 68 for guiding and retaining the photosensitive sheet on guide surface 66 of said edge portion.

The rear of housing 10 includes a rear wall 72 having an opening provided with a door 74 mounted on a hinge 76 secured to the lower portion of rear wall 72. Magazine 34 includes a dependent rear wall 78 secured only at its upper end to upper wall 36 and preferably at one side to side wall 42 in order to permit loading and threading of the sheets through the magazine. Rear wall 78 cooperates with side walls 26 and 42 to define a dark chamber forward of said wall in which sheet 52 is exposed, and cooperates with rear wall 72 and door 74 of housing 10 to define a processing chamber 80. In addition, rear wall 78 prevents the admission of light into the camera housing forward of said wall when door 74 is open and, for this purpose, is provided with a shoulder 81 along its side adapted to engage a corresponding flange 83 on the inside of side wall 26 of housing 20. Thus, photosensitive sheet 52 is advanced from spool 54 on which it is coiled, is positioned for exposure on guide surface 66 and is advanced into superposition with a second sheet in a lighttight chamber defined by rear wall 72, upper wall 36, side wall 26 of housing 20, side wall 42, forward wall 44, and lower wall 46 of magazine 34.

An elongated pressure-applying roller 82 is pivotally mounted below and adjacent the lower edge of rear wall 78 on said wall and on side wall 42. Roller 82 includes a pair of stub shafts 84 extending from its ends, one of shafts 84 being journaled in a bushing in side wall 42 and the other shaft being journaled in a bracket 86 secured to the lateral edge of rear wall 78 and extending downward below its lower edge. Stub shafts 84 each extend laterally beyond the bushing or bracket in which each is journaled so as to be engageable by means in said housing to be described hereinafter.

The rear end portion of lower wall 46 is formed to provide an anvil 88 having a concave curved rear surface 90 conforming to and spaced adjacent roller 82, providing in conjunction therewith a curved passage through which photosensitive sheet 52 is guided around roller 82 rearward of said roller. Anvil 88 includes laterally spaced shoulders 92 at the ends of its lower surface 94, providing raised guide surfaces 96 for supporting second sheet 60 away from surface 94. Second sheet 60 is adapted to extend from compartment 56 across anvil 88 between the latter and bottom wall 30 of housing 10, sheet 60 being supported on guide surfaces 96 of shoulders 92 and then into superposition with photosensitive sheet 52 extending around pressure roller 82. Shoulders 92 are provided with lateral flanges 98 for guiding second sheet 60 in contact with guide surfaces 96 of shoulders 92.

Photosensitive sheet 52 and second sheet 60 are normally supplied, in practice, with their leading ends joined together and attached to a leader to facilitate loading of the sheets into the camera and to obtain proper registration between frames of photosensitive sheet 52 and image-receptive areas of second sheet 60. In practice, the sheets are loaded into the magazine by inserting spool 54, on which photosensitive sheet 52 is coiled, into compartment 50, and the photosensitive sheet is threaded between intermediate wall 48 and upper wall 36 across the open end of passage 70 where it is suported on edge portions 66 between the latter and rear wall 78 and extends between roller 82 and surface 90 of anvil 88 where it is joined to a leader and second sheet 60, adjacent the rear of said roller. Roll 58 of second sheet 60 is inserted into compartment 56 and threaded around anvil 88 between flanges 98 supported on guide surfaces 96 of shoulders 92. The leader (not shown) to which the ends of sheet 52 and 60 are secured is then drawn upward across rear wall 78 and is held in that position as magazine 34 is inserted into housing 20.

A second pressure-applying roller 104 is pivotally mounted within housing 20, both rollers 82 and 104 being so mounted as to be operatively juxtapositioned when magazine 34, mounting roller 82, is operatively positioned within housing 20. In practice, sheet 52 extends from spool 54 past guide surfaces 66 and into contact with roller 82. Sheet 60 extends from roll 58 into contact with roller 104 and into superposition with sheet 52 to form therewith a sandwich which extends between the rollers and into processing chamber 80. Rear wall 78 is so constructed as to define, in conjunction with rear wall 72 of housing 20 and the upper portion of door 74, an exit passage 100 at the upper end of processing chamber 80 through which the aforesaid leader and portions of the sandwich may extend exteriorly of the camera and through which portions of the sandwich positioned within the processing chamber may be removed therefrom. An operator, by grasping the leading portion of the sandwich extending from passage 100, may draw the sandwich through said passage and thereby advance unprocessed portions of sheets 52 and 60 between rollers 82 and 104 into processing chamber 80. Rear wall 78 of magazine 34 extends upward at an angle toward rear wall 72 and door 74 to define a chamber 80 that narrows adjacent passage 100, the latter being rendered lighttight by pads 102 of felt, tufted fabric, or the like secured to rear wall 72, door 74 and rear wall 78 adjacent passage 100, said pads being adapted to engage the surface of sheet material extending through said passage to prevent the admission of light around said sheet material.

The operator, by drawing portions of the sandwich through passage 100, may cause a frame of sheet 52 initially positioned for exposure on guide surface 66 to be advanced toward registration with an image-receiving area of sheet 60. Continued advancement of sheets 52 and 60 between rollers 82 and 104 causes ejection of processing composition from the container associated with said frame and image-receiving area and causes spreading of the processing composition therebetween to form a sandwich. The frame and the image-receiving area advance from rollers 82 and 104 into processing chamber 80 and are permitted to remain therewithin for a predetermined period during which the latent image in the frame is processed and a positive print is formed in the image-receiving area. At the end of the predetermined processing period, the operator may open door 74 to remove the positive print from processing chamber 80. The positive print may be torn from the remainder of sheet 60, the tearing being aided by a series of perforations which separate the image-receiving area from the remainder of sheet 60 and at the same time peeled from the frame of sheet 52 with which it has been registered.

Figure 8:
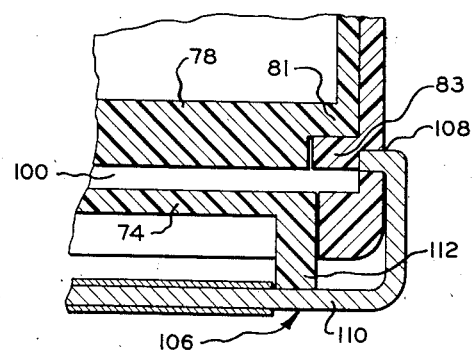
Fig. 8 is a fragmentary view, partially in section, of the upper portion of the housing showing portions of the housing wall, magazine walls and exit passage for sheet materials processed within the housing.

Means are provided for latching door 74, pivoted about hinge 76, in closed position, this means comprising a U-shaped bail 106 (Fig. 8) having reentrant end portions 108 pivotally secured in holes 107 in the upper portion of side walls 26 and 28 of housing 20. The transverse connecting portion 110 of bail 106 is adapted to engage a boss 112 on the upper portion of door 74 to retain the latter in closed position.

Additional shielding means are provided for excluding light from passage 100 and processing chamber 80 and, in the form shown, comprise an L-shaped bar 113 having a longitudinal rolled edge portion 114 at which it is pivotally mounted on connecting portion 110 of bail 106 and a longitudinal cover portion 115 normally in closed position overlying exit passage 100 and having two turned-down ends 116 adapted to extend outside of and engage sidewalls 26 and 28 to retain bar 113 in passage-covering position. Longitudinal cover portion 115 is pivotable to the rear of passage 100 to permit withdrawal of sheet material therethrough and is provided with a sharpened forward edge 117 which, when portion 115 is in closed position, snugly contacts portions of the sandwich extending through passage 100 and serves as a cutting edge or blade against which the operator can draw said portions to sever them from portions of the sandwich remaining within processing chamber 80.

In accordance with the present invention, means are provided for pivotally mounting pressure roller 104 and, in the form shown, comprise a yoke-shaped frame 118 having a transverse base portion 120 and two dependent lateral arm portions 122 extending at right angles from said base. Frame 118 is formed preferably of a single rectangular section of substantially rigid sheet metal bent at its ends to form arms 122. Frame 118 is secured at its base 120 in housing 20 to rear wall 72 adjacent bottom wall 30 with arms 122 extending toward the front of the camera parallel to and adjacent side walls 26 and 28. Any suitable means such as rivets, screws and the like may be provided for securing frame 118 in housing 20 and, in the form shown, frame 118 is retained in housing 20 against movement toward the front of said housing by lateral bosses 124 on bottom wall 30 adapted to engage arms 122, and against movement toward the top of said housing by a light shield 126, the latter being generally rectangular and having a longitudinal edge portion turned up to provide a flange 128. Light shield 126 is secured at its ends in recesses in side walls 26 and 28 across the lower portion of chamber 80 adjacent pressure rollers 82 and 104 so that it bears against arms 122, holding frame 118 against bottom wall 30. Light shield 126 is so positioned that flange 128 is predeterminedly spaced from rear wall 78 of magazine 34 adjacent roller 82 when the magazine is operatively positioned within housing 20 to provide a narrow passage sufficiently wide to permit a sandwich of superposed sheets 52 and 60 to be advanced from pressure rollers 82 and 104 into processing chamber 80 while preventing the admission of light into the lower portion of the camera housing when rear door 74 is open.

Arm portions 122 are adapted to extend toward the front of housing 20 between side walls 26 and 28 thereof and side walls 40 and 42 in magazine 34 when the latter is in operative position within housing 20. Each arm 122 includes a slot 130 in its upper edge adjacent its ends extending upward and adapted to engage one of stub shafts 84 on pressure roller 82. The sides of slots 130 are divergent adjacent the upper edges of arms 122 for guiding stub shafts 84 into said slots when magazine 34 is inserted into proper operating position within housing 20. Since rear wall 78 is unsupported at its end on which roller 82 is mounted, it is desirable that said wall be supported against or relieved of any stress imposed thereon in a direction generally perpendicular to the plane of said wall due to the bias of roller 104 against roller 82, especially during the movement of sheet materials between said rollers. It is by virtue of this arrangement of slots 130 in arms 122 that pressure rollers 82 and 104 are positively positioned relative to one another by frame 118, the latter relieving rear wall 78 of the aforementioned stress. It is apparent that roller 104 is urged upward during movement of the sheets between the rollers and that frame 118 does restrain movement of roller 104 in this direction, resulting in a stress on rear wall 78. However, this stress is exerted in a direction substantially parallel to the plane of rear wall 78, permitting said rear wall to withstand the stress. In addition, the foregoing structure and arrangement permit housing 20 and magazine 34 to be of inexpensive material, preferably of molded plastics which are structurally weak while a single element, that is, frame 118, formed of a structurally strong material such as sheet metal, capable of withstanding severe mechanical stress, is provided to mount the pressure-applying rollers.

To mount pressure roller 104, arms 122 are provided with inwardly extending right angle brackets 132 punched out and formed from arms 122. Each bracket 132 includes a base portion 134 extending inwardly perpendicular to arm 122 and an end portion 136 in a plane generally parallel to arm 122 and extending toward base 120 of frame 118. End portions 136 are each provided with a slot 138 in which, for example, are slidably journaled stub shafts 140 secured to the ends of pressure roller 104. In another form of the invention, stub shafts 140 may be journaled in suitable bushings or bearings slidably mounted in slots 130 for movement forward and rearward in frame 118.

Resilient means are provided for urging roller 104 into juxtaposition with pressure roller 82 and, in the form shown, comprise a single torsion spring 142 comprising a pair of laterally spaced coils 143 joined by an elongated base section 144 extending from side to side of base portion 120 of frame 118 and secured thereto. Base section 144 includes two overturned tabs 146 and a straight tab 148 positioned therebetween and adapted to engage and retain base section 144 of spring 142, said base section extending under tabs 146 and having a curved central portion extending around tab 148. Coils 143 extend at right angles from base section 144 and include end portions 150 adapted to bear against stub shafts 140, retaining said shafts in slots 138 and urging roller 104 forward against roller 82.

Combination stop and control means are provided for arresting movement of the sandwich between rollers 82 and 104 upon advancement of one frame of sheet 52 and the image-receiving area of sheet 60 with which it is registered into processing chamber 80. In order to adapt it for use in the illustrated embodiment, sheet 60 may be provided with pairs of regularly spaced apertures, the openings in a pair being positioned at opposite edges of sheets 60, one pair being associated with one image-receiving area. The stop and control means include anvil 88 having raised guide surfaces 96 in superposition with which sheet 60 is adapted to move during advancement thereof. The stop means comprise a single torsion spring 154 having a pair of laterally spaced coils 156 positioned between coils 143 and having free ends 158 and being joined together by an elongated base section 160 at which spring 154 is secured to base portion 120 of frame 118. Base section 160 is secured to base portion 120 parallel to and adjacent base portion 144 of spring 142 and, together with the latter, extends under tabs 146 and has a curved central portion extending around tab 148.

Frame 118 includes means for positioning free ends 158 of spring 154 adjacent surface 94 of anvil 88 so as to engage a pair of apertures in sheet 60 as the latter is advanced across surface 94 in contact with guide surfaces 96. The last-mentioned positioning means comprise a pair of brackets 162 punched out and turned inwardly toward one another from the ends of arms 122.

Each bracket 162 includes an overturned U-shaped end portion 164 and a punched-out portion providing an opening 166 and a turned-down tab 168 which forms, in conjunction with end portion 164, a rectangular passage 170 through which free end 158 of spring 154 projects. Passage 170 is so formed as to permit axial movement of free end 158 therein and pivotal movement of end 158 in a plane substantially perpendicular to the axes of pressure rollers 82 and 104 while preventing lateral movement of end 158 in a direction parallel to the axes of rollers 82 and 104.

Figure 5:
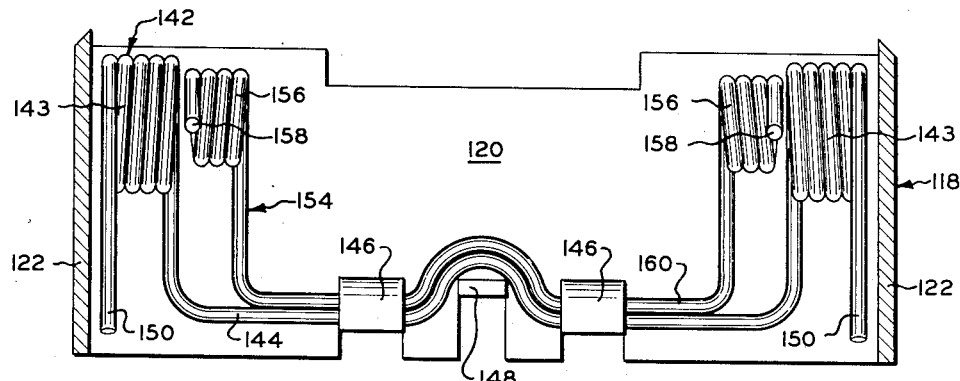
Fig. 5 is a front view, similar to Fig. 3, illustrating spring means for biasing the pressure rollers toward one another and spring means comprising a portion of the stop means.
Figure 3:
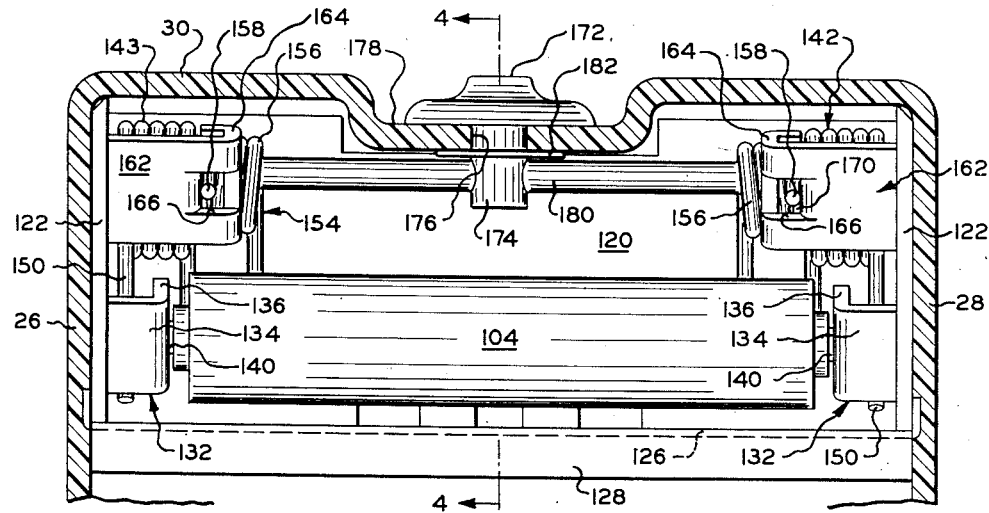
Fig. 3 is a front view of means for mounting one of the pressure rollers and stop means with a portion of the housing shown in section.
Figure 4:
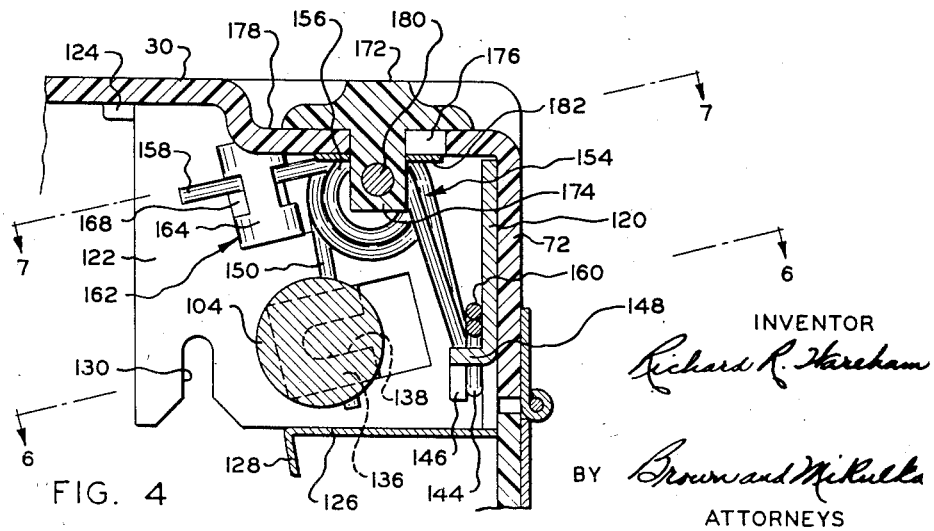
Fig. 4 is a view in section taken substantially along the line 4—4 of Fig. 3.
Figure 6:
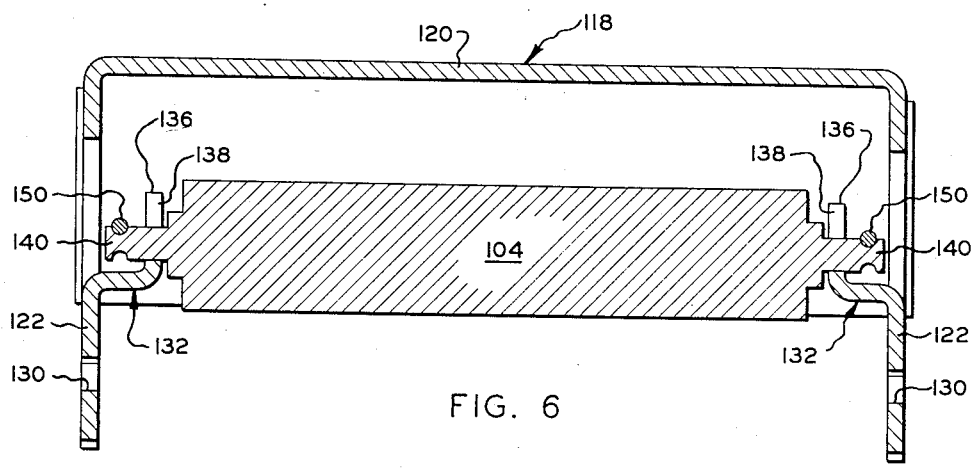
Fig. 6 is a fragmentary sectional view taken along the line 6—6 of Fig. 4 illustrating one of the pressure-rollers and the means for mounting and biasing said one pressure roller toward the other pressure roller.
Figure 7:
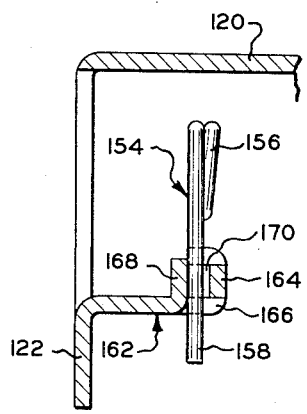
Fig. 7 is a fragmentary sectional view taken along the line 7—7 of Fig. 4 and showing in detail the means for mounting and controlling the spring means comprising the stop mechanism.

Free ends 158 of springs 154 are normally urged by coils 156 into engagement with a pair of apertures in sheet 60 with which they become aligned during advancement of sheet 60 over surface 94 of anvil 88. Coils 156 urge ends 158 in a resultant direction having a first component in the direction of the front of the camera generally perpendicular to sheet 60 as it moves across the surface of anvil 88 and a second component generally upward viewing Fig. 5 parallel to and opposite the direction of advancement of sheet 60, past anvil 88. As sheet 60 is advanced past anvil 88 into superposition with sheet 52 between rollers 82 and 104, at least one of ends 158 of spring 154 projects into one of a pair of apertures as the latter become aligned with said ends 158. End 158 is then carried along in said aperture until it reaches the limit of movement of said end permitted by the sides of passage 170 where it causes the advancement of sheet 60 to be arrested.

Release means are provided for withdrawing free ends 158 from engagement with apertures 152 in sheet 60 so as to permit movement of sheets 52 and 60 and repetition of the exposure and processing cycle. In the illustrated embodiment, the release means include a manually engageable button 172 having a shank 174 mounted for sliding movement toward the rear of housing 20 in a slot 176 in a recessed portion 178 of the rear of bottom wall 30 of housing 20. An elongated bar 180 is provided extending through coils 156 of spring 142 and at its center through a hole in shank 174 of button 172. To retain button 172 in slot 176, there is provided a washer 182 on shank 174 retained thereon by bar 180. Movement of button 172 toward the rear of housing 20 results in movement of coils 156 together with free ends 158 rearward out of engagement with the apertures in sheet 60. Upon release of ends 158 from the apertures in sheet 60, coils 156 urge ends 158 toward bottom wall 30 in passage 170 in a direction opposite the direction of movement of sheet 60 across anvil 88 and out of alignment with said pair of apertures in which they were previously engaged. Thus, free ends 158 are in position when button 172 is released to ride or bear on the surface of sheet 60 during advancement of said sheet until the next successive pair of apertures in sheet 60 becomes aligned with ends 158.

In the operation of the illustrated camera, magazine 34 is removed from housing 20 to permit loading supplies of sheets 52 and 60 into the magazine. Spool 54 is mounted in compartment 50 and roll 58 is inserted into compartment 56. Sheet 52 is drawn from spool 54 between intermediate wall 48 and upper wall 36 onto guide surfaces 66 which position frames of sheets 52 in the focal surface of lens 22. Sheet 60 extends from roll 58 across anvil 88 into superposition with sheet 52 across the rear of roller 82 and rear wall 78 of magazine 34. Magazine 34 is then inserted into housing 20 into proper operating position in order to operatively juxtapose rollers 82 and 104 and to form processing chamber 80. Bail 106 may then be pivoted rearward to hold door 74 in closed position. The leading ends of sheets 52 and 60 extending from processing chamber 80 through exit passage 100 are now grasped and drawn from processing chamber 80 until free ends 158 comprising the stop means engage the apertures in sheet 60 which are associated with the leading frame of sheet 52. The leading frame of sheet 52 is now in position for exposure. After exposure of this frame, button 172 is moved rearward, disengaging ends 158 from the apertures with which they have been engaged. An operator once again may grasp the leading end of sheets 52 and 60 and may advance the sheets between rollers 82 and 104 until ends 158 of spring 154 engage the next successive pair of apertures in sheet 60. During advancement of sheets 52 and 60 between rollers 82 and 104 and into processing chamber 80, processing composition is ejected from the container associated with the image-receiving area of sheet 60 and is spread between a frame of sheet 52 and said image-receiving area of sheet 60, the processing composition acting to process the frame to form in the image-receiving area a positive print. When the superposed frame and image-receiving area have remained in processing chamber 80 for a predetermined processing period, door 74 is opened and the section of sheet 60 carrying the positive print is ripped from the remainder of sheet 60 and at the same time is peeled from the frame of sheet 52. As the exposure and processing cycle continues, portions of sheets 52 and 60 that extend through exit passage 100 may be evenly severed from the remainder of sheets 52 and 60 by means of the sharpened edge 117 of bar 113.

While the upper portion of housing 20 has been described as being open to provide a passage 32 for a removable magazine 34 having an upper wall 36 forming a closure for said passage, it is to be understood that the invention is not limited to the camera herein described since it is apparent that passage 32 could be provided equally as well in either side of or in the bottom of housing 20 and the terms "bottom wall," "upper wall" and "side wall," as well as "lower" and "upward" have been arbitrarily applied to walls of the housing and magazine and to directions with respect thereto, for purposes of illustration and description and not for purposes of limiting the disclosure.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, said magazine comprising a closure for said opening, exposure means associated with a wall of said housing, said magazine including a wall closing said opening, means for mounting supplies of said first and second sheets on said magazine, guide means for positioning frames of said first sheet for exposure and means comprising a portion of said magazine for mounting a pressure-applying member on said magazine, means secured within said housing for mounting another pressure-applying member, means comprising portions of said magazine for guiding said first and second sheets into superposition between said pressure-applying members, the latter causing the release of said processing composition during movement of said sheets between said members, portions of said magazine cooperating with said housing to define a chamber into which portions of said superposed first and second sheets are advanced from said pressure-applying members during processing, and an exit passage in said chamber through which portions of said superposed first and second sheets may be withdrawn from said chamber.

2. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, exposure means associated with a wall of said housing, said magazine including a wall providing a closure for said opening, means mounting supplies of said first and second sheets on said magazine, guide means comprising a portion of said magazine for positioning portions of said first sheet for exposure and menas mounting a first pressure-applying member on said magazine, means secured within said housing for mounting a second pressure-applying member in juxtaposition with said first pressure-applying member when said magazine is in operative position within said housing, said first and second sheets being adapted to be superposed and drawn between said pressure-applying members to release said processing composition, said magazine having a wall adjacent and cooperating with the wall of said housing opposite said exposure means to provide a chamber into which portions of said superposed first and second sheets may be advanced from said pressure-applying members during processing, and an exit passage at the end of said chamber opposite said pressure-applying members through which portions of said superposed first and second sheets are withdrawn from said chamber.

3. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the forward wall of said housing, said magazine including a wall providing a closure for said opening, means for mounting rolls of said first and second sheets on said magazine, guide means providing guide surfaces on which portions of said first sheet are positioned for exposure in the focal surface of said lens and means for pivotally mounting a first pressure-applying roller on said magazine, means secured within said housing adjacent the side wall thereof opposite said opening for mounting a second pressure-applying roller in juxtaposition with said first pressure-applying roller when said magazine is in operative position within said housing, said first and second sheets being adapted to be superposed and drawn between said pressure-applying rollers to release said processing composition, said magazine having a rear wall positioned adjacent and cooperating with the rear wall of said housing to provide a chamber into which portions of said superposed first and second sheets may be advanced from said pressure-applying rollers during processing, an exit passage at the end of said chamber opposite said pressure-applying rollers through which portions of said superposed first and second sheets are withdrawn from said chamber, stop means coperating with a portion of said magazine for arresting movement of said sheets through said camera, and means for controlling said stop means.

4. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the forward wall of said housing, said magazine including a wall providing a closure for said opening, means for mounting rolls of said first and second sheets on said magazine, guide means providing guide surfaces on which portions of said first sheet are positioned for exposure in the focal surface of said lens, a first pressure-applying roller, means for pivotally mounting said first pressure-applying roller on said magazine and a rear wall positioned adjacent the rear wall of said housing, a second pressure-applying roller, means within said housing for pivotally mounting said second pressure-applying roller in juxtaposition with said first pressure-applying roller when said magazine is in operative position within said housing, said first and second sheets being adapted to be superposed and drawn between said pressure-applying rollers to release said processing composition for distribution on said first sheet, said rear wall of said magazine cooperating with the rear wall of said housing to provide, when said magazine is operatively mounted within said housing, a processing chamber into which portions of said superposed first and second sheets may be advanced from said pressure-applying rollers during processing, a door in said rear wall of said housing adapted to be opened to permit removal of portions of said sheets from said chamber, said rear wall of said magazine cooperating with the walls of said housing to prevent admission of light into the portion of said housing forward of said rear wall, and in which said first photosensitive sheet is mounted and exposed, when said door is open, an exit passage at the end of said chamber opposite said pressure-applying rollers through which portions of said superposed first and second sheets are withdrawn from said chamber, stop means cooperating with a portion of said magazine for arresting movement of said sheets through said camera, and means for controlling said stop means.

5. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, exposure means associated with a wall of said housing, said magazine comprising a first wall providing a closure for said opening, a second wall spaced from said first wall and so formed as to mount a roll of said second sheet, an intermediate wall positioned between said first and second walls and so formed as to mount a roll of said first sheet, guide means for positioning portions of said first sheet for exposure and means for mounting a first pressure-applying member on said magazine, means secured within said housing for mounting a second pressure-applying member in juxtaposition with said first pressure-applying member when said magazine is operatively positioned within said housing, means comprising portions of said magazine for guiding said first and second sheets into superposition between said pressure-applying members, the latter causing release of said processing composition for distribution between said first and second sheets during movement of said sheets between said members, portions of said magazine cooperating with said housing to define a chamber into which portions of said superposed first and second sheets are advanced from said pressure-applying members during processing, and an exit passage in said chamber through which portions of said superposed first and second sheets may be withdrawn from said chamber.

6. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, exposure means associated with the forward wall of said housing, said magazine comprising a wall providing a closure for said opening, a second wall spaced from said first wall and so formed as to mount a roll of said second sheet, an intermediate wall positioned between said first and second walls and so formed as to mount a roll of said first sheet, guide means for positioning portions of said first sheet for exposure, a first pressure-applying member, means for mounting said first pressure-applying member on said magazine and a rear wall, a second pressure-applying member, means within said housing for mounting said second pressure-applying member in juxtaposition with said first pressure-applying member when said magazine is operatively positioned within said housing, means comprising portions of said magazine for guiding said first and second sheets into superposition between said pressure-applying members, the latter causing release of said processing composition for distribution between said first and second sheets during movement of said sheets between said members, said rear wall of said magazine cooperating with the rear wall of said housing to define a chamber into which portions of said superposed first and second sheets are advanced from said pressure-applying members during processing, a door in said rear wall of said housing adapted to be opened to permit removal of portions of said sheets from said chamber, said rear wall of said magazine cooperating with the walls of said housing to prevent admission of light into the portion of said housing forward of said rear wall and in which said first photosensitive sheet is mounted and exposed, when said door is open, and an exit passage in said chamber through which said superposed first and second sheets may be withdrawan from said chamber.

7. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, shutter means associated with the front wall of said housing, said magazine comprising a first wall providing a closure for said opening, a second wall spaced from said first wall and so formed as to provide means for mounting a roll of said second sheet, an intermediate wall positioned adjacent said first wall between the latter and said second wall, said intermediate wall being so formed as to mount a roll of said first sheet, guide means providing guide surfaces on which portions of said first sheet are positioned for exposure in the focal surface of said lens and means pivotally mounting a first pressure-applying roller on said magazine, means secured within said housing adjacent the wall thereof opposite said opening for pivotally mounting a second pressure-applying roller in operative juxtaposition with said first pressure-applying roller when said magazine is in operative position within said housing, said first and second sheets being adapted to be superposed and drawn between said pressure-applying rollers to cause release of said processing composition for distribution between said first and second sheets, said magazine having a rear wall positioned adjacent and cooperating with the rear wall of said housing to provide a processing chamber into which portions of said superposed first and second sheets may be advanced from said pressure-applying rollers during processing, and an exit passage at the end of said chamber opposite said pressure-applying rollers through which portions of said superposed first and second sheets are withdrawn from said chamber.

8. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, exposure means associated with the front wall of said housing, said magazine comprising a first wall providing a closure for said opening, a second wall spaced from said first wall and so formed as to provide means for mounting a roll of said second sheet, an intermediate wall positioned adjacent said first wall between the latter and said second wall, said intermediate wall being so formed as to provide means for mounting a roll of said first sheet, guide means extending between said intermediate and second walls for positioning portions of said first sheet for exposure, and a rear wall dependent from said first wall, means secured to said rear wall for pivotally mounting a first pressure-applying roller, means secured within said housing for pivotally mounting a second pressure-applying roller in juxtaposition with said first pressure-applying roller when said magazine is in operative position within said housing, said first and second sheets being adapted to be superposed and drawn between said pressure-applying rollers to release said processing composition for distribution between said first and second sheets, said rear wall of said magazine cooperating with the rear wall of said housing to provide a chamber into which portions of said superposed first and second sheets may be advanced from said pressure-applying rollers during processing, and an exit passage at the end of said chamber opposite said pressure-applying rollers through which portions of said superposed first and second sheets are withdrawn from said chamber.

9. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, exposure means associated with the front wall of said housing, said magazine comprising a first wall providing a closure for said opening, a second wall spaced from said first wall and so formed as to provide means for mounting a roll of said second sheet, an intermediate wall positioned adjacent said first wall between the latter and said second wall, said intermediate wall being so formed as to provide means for mounting a roll of said first sheet, guide means for positioning portions of said first sheet for exposure, a rear wall dependent from said second wall, a first pressure-applying roller and means secured to said rear wall for pivotally mounting said first pressure-applying roller, a second pressure-applying roller, means within said housing for pivotally mounting said second pressure-applying roller in juxtaposition with said first pressure-applying roller when said magazine is in operative position within said housing, said first and second sheets being adapted to be superposed and drawn between said pressure-applying rollers to release said processing composition for distribution between said first and second sheets, said rear wall of said magazine cooperating with the rear wall of said housing to provide a chamber into which portions of said superposed first and second sheets may be advanced from said pressure-applying rollers during processing, a door in said rear wall of said housing being adapted to be opened to permit removal of said sheets from said chamber, said rear wall of said magazine cooperating with walls of said housing to prevent the admission of light into the portion of said housing forward of said rear wall, and in which said first sheet is mounted and exposed, when said door is open, and an exit passage at the end of said chamber opposite said pressure-applying rollers through which portions of said superposed first and second sheets are withdrawn from said chamber.

10. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the front wall of said housing, said magazine comprising a first wall providing a closure for said opening, a second wall spaced from said first wall and so formed as to provide a rounded compartment adapted to house a roll of said second sheet, an intermediate wall positioned adjacent said first wall between the latter and said second wall, said intermediate wall being so formed as to provide a rounded compartment adapted to house a roll of said first sheet, guide means extending between said intermediate and second walls and providing guide surfaces on which portions of said first sheet are positioned for exposure in the focal surface of said lens and means for pivotally mounting a first pressure-applying roller on said magazine, means secured within said housing adjacent the wall thereof opposite said opening for pivotally mounting a second pressure-applying roller in juxtaposition with said first pressure-applying roller when said magazine is operatively positioned within said housing, portions of said second and intermediate walls comprising means for guiding said first and second sheets into superposition between said pressure-applying rollers, said first and second sheets being adapted to be drawn between said rollers to release said processing composition for distribution between said first and second sheets, said magazine having a rear wall dependent from said first wall and cooperating with the rear wall of said housing to provide a chamber into which portions of said superposed first and second sheets may be advanced from said pressure-applying rollers during processing, and an exit passage at the end of said chamber opposite said pressure-applying rollers through which portions of said superposed first and second sheets are withdrawn from said chamber.

11. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, exposure means associated with the front wall of said housing, said magazine comprising a first wall providing a closure for said opening, a second wall spaced from said first wall and so formed as to provide a rounded compartment adapted to house a roll of said second sheet, an intermediate wall positioned adjacent said first wall between the latter and said second wall, said intermediate wall being so formed as to provide a rounded compartment adapted to mount and house a roll of said first sheet coiled on a spool, means providing guide surfaces on which portions of said first sheet are positioned for exposure, a dependent rear wall secured at one end to said first wall and having its other end free, a first pressure-applying roller and means for pivotally mounting said first pressure-applying roller on the free end of said rear wall, a second pressure-applying roller, means within said housing for mounting said second pressure-applying roller in juxtaposition with said first pressure-applying roller when said magazine is operatively positioned within said housing, portions of said second and intermediate walls comprising means for guiding said second sheet into superposition with said first sheet between said pressure-applying rollers, said first and second sheets being adapted to be drawn between said rollers to release said processing composition for distribution between said first and second sheets, said dependent rear wall cooperating with the rear wall of said housing, when said magazine is in operative position within said housing, to provide a processing chamber into which portions of said superposed first and second sheets may be advanced from said pressure-applying rollers during processing, and an exit passage at the end of said chamber opposite said pressure-applying rollers through which portions of said superposed first and second sheets are withdrawn from said chamber.

12. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, exposure means associated with the front wall of said housing, said magazine comprising a first wall providing a closure for said opening, a second wall spaced from said first wall and so formed as to provide a rounded compartment adapted to house a roll of said second sheet, an intermediate wall positioned adjacent said first wall between the latter and said second wall, said intermediate wall being so formed as to provide a rounded compartment adapted to mount and house a roll of said first sheet coiled on a spool, guide means providing surfaces on which portions of said first sheet are positioned for exposure, a dependent rear wall secured at one end to said first wall and having its other end free, a first pressure-applying roller and means for pivotally mounting said first pressure-applying roller on the free end of said rear wall, a second pressure-applying roller, means within said housing for mounting said second pressure-applying roller in juxtaposition with said first pressure-applying roller when said magazine is operatively positioned within said housing, portions of said second and intermediate walls comprising means for guiding said second sheet into superposition with said first sheet between said pressure-applying rollers, said first and second sheets being adapted to be drawn between said rollers to release said processing composition for distribution between said first and second sheets, said dependent rear wall cooperating with the rear wall of said housing, when said magazine is in operative position within said housing, to provide a processing chamber into which portions of said superposed first and second sheets may be advanced from said pressure-applying rollers during processing, said rear wall of said housing being provided with a door adapted to be opened to permit removal of portions of said sheets from said chamber, said dependent rear wall of said magazine cooperating with the walls of said housing to prevent admission of light into the portion of said housing forward of said rear wall and in which said first sheet is mounted and exposed, when said door is open, and an exit passage at the end of said chamber opposite said pressure-applying rollers through which portions of said superposed first and second sheets are withdrawn from said chamber.

13. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the forward wall of said housing, said magazine including a first wall providing a closure for said opening, a second wall dependent from said first wall and positioned at the forward end of said magazine adjacent and substantially parallel to said forward wall of said housing, an aperture in said second wall aligned with said lens, means for mounting rolls of said first and second sheets on said magazine, guide means providing guide surfaces on which portions of said first sheet are positioned for exposure in the focal surface of said lens to light transmitted through said aperture, a first pressure-applying roller and means for pivotally mounting said first pressure-applying roller on said magazine, a second pressure-applying roller, means within said housing for mounting said second pressure-applying roller in juxtaposition with said first pressure-applying roller when said magazine is in operative position within said housing, said first and second sheets being adapted to be superposed and drawn between said pressure-applying rollers to release said processing composition for distribution between said first and second sheets, said magazine having a rear wall positioned adjacent and cooperating with the rear wall of said housing to provide a chamber into which portions of said superposed first and second sheets may be advanced from said pressure-applying rollers during processing, and an exit passage at the end of said chamber opposite said pressure-applying rollers through which portions of said superposed first and second sheets are withdrawn from said chamber.

14. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, exposure means associated with the front wall of said housing, said magazine comprising a first wall providing a closure for said opening, a second wall spaced from said first wall and so formed as to provide means for mounting a roll of said second sheet, an intermediate wall positioned adjacent said first wall between the latter and said second wall, said intermediate wall being so formed as to provide means for mounting a roll of said first sheet, guide means for positioning portions of said first sheet for exposure, a front wall dependent from said first wall and substantially parallel to the front wall of said housing, said front wall having an exposure aperture aligned with said exposure means for transmitting light to portions of said first sheet positioned on said guide means for exposure, a rear wall dependent from said first wall, a first pressure-applying roller, means secured to said rear wall for pivotally mounting said first pressure-applying roller, a second pressure-applying roller, means within said housing for pivotally mounting said second pressure-applying roller in juxtaposition with said first pressure-applying roller when said magazine is in operative position within said housing, said first and second sheets being adapted to be superposed and drawn between said pressure-applying rollers to release said processing composition for distribution between said first and second sheets, said rear wall of said magazine cooperating with the rear wall of said housing to provide a chamber into which portions of said superposed first and second sheets may be advanced from said pressure-applying rollers during processing, and an exit passage at the end of said chamber opposite said pressure-applying rollers through which portions of said superposed first and second sheets are withdrawn from said chamber.

15. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, exposure means associated with a wall of said housing, said magazine including a first wall providing a closure for said opening, a pair of laterally spaced dependent walls extending from front to rear of said magazine, means mounted between said dependent walls for mounting supplies of said first and second sheets on said magazine, guide means for positioning portions of said first sheet for exposure, a first pressure-applying member and means for mounting said first pressure-applying member on said magazine, a second pressure-applying member, means secured within said housing adjacent the wall thereof opposite said opening for mounting said second pressure-applying member in juxtaposition with said first pressure-applying member when said magazine is in operative position within said housing, said first and second sheets being adapted to be superposed and drawn between said pressure-applying members to release said processing composition for distribution between said first and second sheets, said magazine having a rear wall adjacent and cooperating with the rear wall of said housing to provide, when said magazine is operatively positioned within said housing, a chamber into which portions of said superposed first and second sheets may be advanced from said pressure-applying members during processing, and an exit passage at the end of said chamber opposite said pressure-applying members through which portions of said first and second sheets are withdrawn from said chamber.

16. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the forward wall of said housing, said magazine including a first wall providing a closure for said opening, a pair of laterally spaced dependent walls extending from front to rear of said magazine, means secured between said dependent walls for mounting rolls of said first and second sheets on said magazine, portions of said dependent walls providing guide surfaces on which portions of said first sheet are positioned for exposure in the focal surface of said lens, a first pressure-applying roller and means for pivotally mounting said first pressure-applying roller on said magazine, a second pressure-applying roller, means within said housing for pivotally mounting said second pressure-applying roller in juxtaposition with said first pressure-applying roller when said magazine is in operative position within said housing, said first and second sheets being adapted to be superposed and drawn between said pressure-applying rollers to release said processing composition for distribution between said first and second sheets, said magazine having a rear wall positioned adjacent and cooperating with the rear wall of said housing to provide, when said magazine is operatively positioned within said housing, a chamber into which portions of said superposed first and second sheets may be advanced from said pressure-applying rollers during processing, and an exit passage at the end of said chamber opposite said pressure-applying rollers through which portions of said superposed first and second sheets are withdrawn from said chamber.

17. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the forward wall of said housing, said magazine including a first wall providing a closure for said opening, a pair of laterally spaced dependent walls extending from front to rear of said magazine, means secured between said dependent walls for mounting rolls of said first and second sheets on said magazine, portions of said dependent walls providing guide surfaces on which portions of said first sheet are positioned for exposure in the focal surface of said lens, a first pressure-applying roller, means for pivotally mounting said first pressure-applying roller on said magazine and a rear wall positioned adjacent the rear wall of said housing, a second pressure-applying roller, means within said housing for pivotally mounting said second pressure-applying roller in juxtaposition with said first pressure-applying roller when said magazine is in operative position within said housing, said first and second sheets being adapted to be superposed and drawn between said pressure-applying rollers to release said processing composition for distribution between said first and second sheets, said rear wall of said magazine cooperating with said rear wall of said housing to provide, when said magazine is operatively positioned within said housing, a chamber into which portions of said superposed first and second sheets may be advanced from said pressure-applying rollers during processing, and an exit passage at one end of said chamber opposite said pressure-applying rollers through which portions of said superposed sheets are withdrawn from said chamber.

18. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, exposure means associated with a wall of said housing, said magazine including a first wall providing a closure for said opening, a pair of laterally spaced dependent walls extending from front to rear of said magazine, means mounted between said dependent walls for mounting supplies of said first and second sheets on said magazine, guide means for positioning portions of said first sheet for exposure, a dependent rear wall secured at one end to said first wall, a first pressure-applying member and means for mounting said pressure-applying member on said rear wall adjacent the free end thereof, means within said housing for mounting a second pressure-applying member in juxtaposition with said first pressure-applying member when said magazine is in operative position within said housing, said first and second sheets being adapted to be superposed and drawn between said pressure-applying members to release said processing composition for distribution between said first and second sheets, said rear wall of said magazine being positioned adjacent the rear wall of said housing and cooperating with the latter, when said magazine is operatively positioned within said housing, to provide a chamber into which portions of said superposed first and second sheets may be advanced from said pressure-applying members during processing, and an exit passage at the end of said chamber opposite said pressure-applying members through which portions of said first and second sheets are withdrawn from said chamber.

19. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the forward wall of said housing, said magazine including a first wall providing a closure for said opening, a pair of laterally spaced dependent walls extending from front to rear of said magazine, means secured between said dependent walls for mounting rolls of said first and second sheets on said magazine, portions of said dependent walls providing guide surfaces on which portions of said first sheet are positioned in the focal surface of said lens, a dependent rear wall secured at one end to said first wall, a first pressure-applying roller and means for pivotally mounting said first pressure-applying roller on said rear wall adjacent the free end thereof, a second pressure-applying roller, means within said housing for pivotally mounting said second pressure-applying roller in juxtaposition with said first pressure-applying roller when said magazine is in operative position within said housing, said first and second sheets being adapted to be superposed and drawn between said pressure-applying rollers to release said processing composition for distribution between said first and second sheets, said rear wall of said magazine cooperating with the rear wall of said housing, when said magazine is operatively positioned within said housing, to form a processing chamber into which portions of said superposed first and second sheets may be advanced from said pressure-applying rollers during processing, and an exit passage at the end of said chamber opposite said pressure-applying rollers through which portions of said superposed first and second sheets are withdrawn from said processing chamber.

20. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, exposure means associated with a wall of said housing, said magazine including a first wall providing a closure for said opening, a pair of laterally spaced dependent walls extending from front to rear of said magazine, means mounted between said dependent walls for mounting supplies of said first and second sheets on said magazine, guide means for positioning portions of said first sheet for exposure, a dependent front wall extending between said laterally spaced dependent walls, an aperture in said front wall for transmitting actinic light to portions of said first sheet positioned for exposure by said guide means, a dependent rear wall secured at one end to said first wall, a first pressure-applying member and means for mounting said pressure-applying member on said rear wall adjacent the free end thereof, a second pressure-applying member, means within said housing for mounting said second pressure-applying member in juxtaposition with said first pressure-applying member when said magazine is in operative position within said housing, said first and second sheets being adapted to be superposed and drawn between said pressure-applying members to release said processing composition for distribution between said first and second sheets, said rear wall of said magazine being positioned adjacent the rear wall of said housing and cooperating with the latter, when said magazine is operatively positioned within said housing, to provide a chamber into which portions of said superposed first and second sheets may be advanced from said pressure-applying members during processing, and an exit passage at the end of said chamber opposite said pressure-applying members through which portions of said first and second sheets are withdrawn from said chamber.

21. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the forward wall of said housing, said magazine including a first wall providing a closure for said opening, a pair of laterally spaced dependent walls extending from front to rear of said magazine, means secured between said dependent walls for mounting rolls of said first and second sheets on said magazine, portions of said dependent walls providing guide surfaces on which portions of said first sheet are positioned in the focal surface of said lens, a dependent front wall joining said lateral walls, said dependent front wall including an aperture positioned adjacent said lens and adapted to transmit actinic light from said lens to portions of said first sheet positioned on said guide surfaces, a dependent rear wall secured at one end to said first wall, a first pressure-applying roller and means for pivotally mounting said first pressure applying roller on said rear wall adjacent the free end thereof, a second pressure-applying roller, means within said housing for pivotally mounting said second pressure-applying roller in juxtaposition with said first pressure-applying roller when said magazine is in operative position within said housing, said first and second sheets being adapted to be superposed and drawn between said pressure-applying rollers to release said processing composition for distribution between said first and second sheets, said rear wall of said magazine cooperating with the rear wall of said housing to provide, when said magazine is operatively positioned within said housing, a processing chamber into which portions of said superposed first and second sheets may be advanced from said pressure-applying rollers during processing, and an exit passage at the end of said chamber opposite said pressure-applying rollers through which portions of said superposed first and second sheets are withdrawn from said processing chamber.

22. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the forward wall of said housing, said magazine including a first wall providing a closure for said opening, a pair of laterally spaced dependent walls extending from front to rear of said magazine, means secured between said dependent walls for mounting rolls of said first and second sheets on said magazine, the rear portions of said dependent walls providing guide surfaces on which portions of said first sheet are positioned in the focal surface of said lens, a dependent front wall joining said lateral walls, said dependent front wall including an aperture positioned adjacent said lens and adapted to transmit actinic light from said lens to portions of said first sheet positioned on said guide surfaces, a dependent rear wall secured at one end to said first wall, a first pressure-applying roller and means for pivotally mounting said first pressure-applying roller on said rear wall adjacent the free end thereof, a second pressure-applying roller, means within said housing for pivotally mounting said second pressure-applying roller in juxtaposition with said first pressure-applying roller when said magazine is in operative position within said housing, said first and second sheets being adapted to be superposed and drawn between said pressure-applying rollers to release said processing composition for distribution between said first and second sheets, said rear wall of said magazine cooperating with the rear wall of said housing to provide, when said magazine is operatively positioned within said housing, a processing chamber into which portions of said superposed first and second sheets may be advanced from said pressure-applying rollers during processing, a door in said rear wall of said housing adapted to be opened to permit removal of portions of said sheets from said chamber, said rear wall of said magazine cooperating with the walls of said housing to prevent admission of light into the portion of said housing forward of said rear wall and in which said first photosensitive sheet is mounted and exposed, when said door is open, and an exit passage at the end of said chamber opposite said pressure-applying rollers through which portions of said superposed first and second sheets are withdrawn from said processing chamber.

23. A camera of the type wherein a first sheet of photosensitive material is exposed and hereafter processed in conjunction with a second sheet by a liquid processing composition releasably carried by one of said sheets, said camera comprising, in combination, a housing having an opening in one side providing a passage, a magazine mounted within said housing removable through said passage, exposure means associated with a wall of said housing, said magazine comprising a first wall providing a closure for said opening, a pair of laterally spaced dependent walls extending from front to rear of said magazine, a second wall spaced from said first wall and extending between said dependent walls, said second wall being adapted to mount a supply of said second sheet, an intermediate wall positioned between said first and second walls and extending between said dependent walls, said intermediate wall being adapted to mount a supply of said first sheet, guide means for positioning portions of said first sheet for exposure, a first pressure-applying member and means for mounting said first pressure-applying member on said magazine, a second pressure-applying member, means within said housing for mounting said second pressure-applying member in juxtaposition with said first pressure-applying member when said magazine is in operative position within said housing, said first and second sheets being adapted to be superposed and drawn between said pressure-applying members to release said processing composition for distribution between said first and second sheets, said magazine having a rear wall adjacent the rear of said housing and adapted to provide, in conjunction with the rear wall of said housing, a chamber into which portions of said superposed first and second sheets may be advanced from said pressure-applying members during processing, and an exit passage at the end of said chamber opposite said pressure-applying members through which portions of said first and second sheets are withdrawn from said chamber.

24. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, exposure means associated with the forward wall of said housing, said magazine comprising a first wall providing a closure for said opening, a pair of laterally spaced dependent walls extending from front to rear of said magazine, the rear portions of said dependent walls providing guide surfaces on which portions of said first sheet are positioned for exposure, a second wall spaced from said first wall and extending between said dependent walls, said second wall being so formed as to mount a supply of said second sheet, an intermediate wall positioned between said first and second walls and extending between said dependent walls, said intermediate wall being so formed as to mount a supply of said first sheet, a first pressure-applying member and means for mounting said first pressure-applying member on said magazine, a second pressure-applying member, means within said housing for mounting said second pressure-applying member in juxtaposition with said first pressure-applying member when said magazine is in operative position within said housing, said first and second sheets being adapted to be superposed and drawn between said pressure-applying members to release said processing composition for distribution between said first and second sheets, said magazine having a rear wall adjacent and cooperating with the rear wall of said housing to provide, when said magazine is operatively positioned within said housing, a chamber into which portions of said superposed first and second sheets may be advanced from said pressure-applying members during processing, and an exit passage at the end of said chamber opposite said pressure-applying members through which portions of said first and second sheets are withdrawn from said chamber.

25. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the front wall of said housing, said magazine comprising a first wall providing a closure for said opening, a pair of laterally spaced dependent walls extending from front to rear of said magazine substantially parallel to the walls of said housing, the rear portions of said dependent walls providing guide surfaces on which portions of said first and second sheets are positioned for exposure in the focal surface of said lens, a second wall spaced from said first wall and extending between said dependent walls, said second wall being so formed as to mount a roll of said second sheet, an intermediate wall position between said second and first walls adjacent to the latter and extending between said dependent walls, said intermediate wall being so formed as to mount a roll of said first sheet, a first pressure-applying roller and means for pivotally mounting said first pressure-applying roller on said magazine, a second pressure-applying roller, means within said housing for pivotally mounting said second pressure-applying roller in juxtaposition with said first pressure-applying roller when said magazine is in operative position within said housing, said first and second sheets being adapted to be superposed and drawn between said pressure-applying rollers to release said processing composition for distribution between said first and second sheets, said magazine having a rear wall position adjacent and cooperating with the rear wall of said housing to provide, when said magazine is operatively positioned within said housing, a chamber into which portions of said superposed first and second sheets may be advanced from said pressure-applying rollers during processing, and an exit passage at the end of said chamber opposite said pressure-applying rollers through which portions of said first and second sheets are withdrawn from said chamber.

26. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the front wall of said housing, said magazine comprising a first wall providing a closure for said opening, a pair of laterally spaced dependent walls extending from front to rear of said magazine substantially parallel to the walls of said housing, the rear portions of said dependent walls providing guide surfaces on which portions of said first sheet are positioned for exposure in the focal surface of said lens, a second wall spaced from said first wall and extending between said dependent walls, said second wall being so formed as to provide a rounded compartment having a rounded opening in one end through one of said dependent walls and being adapted to mount a roll of said second sheet, an intermediate wall positioned between said second and first walls adjacent the latter and extending between said dependent walls, said second wall being so formed as to provide a rounded compartment having a rounded opening at one end through said one dependent wall and being adapted to mount and house a roll of said first sheet, a first pressure-applying roller and means for pivotally mounting said first pressure-applying roller on said magazine, a second pressure-applying roller, means within said housing for pivotally mounting said second pressure-applying roller in juxtaposition with said first pressure-applying roller when said magazine is mounted in operative position within said housing, said first and second sheets being adapted to be superposed and drawn between said pressure-applying rollers to release said processing composition for distribution between said first and second sheets, said magazine having a rear wall positioned adjacent and cooperating with the rear wall of said housing, when said magazine is in operative position within said housing, to provide a processing chamber into which portions of said superposed first and second sheets may be advanced from said pressure-applying rollers during processing, and an exit passage at the end of said processing chamber opposite said pressure-applying rollers through which portions of said superposed first and second sheets are withdrawn from said processing chamber.

27. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the front wall of said housing, said magazine comprising a first wall providing a closure for said opening, a pair of laterally spaced dependent walls extending from front to rear of said magazine substantially parallel to the walls of said housing, the rear portions of said dependent walls providing guide surfaces on which portions of said first and second sheets are positioned for exposure in the focal surface of said lens, a second wall spaced from said first wall and extending between said dependent walls, said second wall being so formed as to mount a roll of said second sheet, an intermediate wall positioned between said second and first walls adjacent the latter and extending between said dependent walls, said intermediate wall being so formed as to mount a roll of said first sheet, portions of said intermediate wall providing means for guiding said first sheet from said roll between said intermediate and first walls and onto said guide surfaces, said second wall, together with said intermediate wall and said dependent walls, cooperating to define a passage through which actinic light is transmitted from said lens to portions of said first sheet positioned for exposure on said guide surfaces, a first pressure-applying roller and means for pivotally mounting said first pressure-applying roller on said magazine, a second pressure-applying roller, means within said housing for pivotally mounting said second pressure-applying roller in juxtaposition with said first pressure-applying roller when said magazine is in operative position within said housing, a portion of said second wall providing a guide member for guiding said second sheet into superposition with said first sheet between said pressure-applying rollers, said first and second sheets being adapted to be superposed and drawn between said pressure-applying rollers to release said processing composition for distribution between said first and second sheets, said magazine having a rear wall positioned adjacent and cooperating with the rear wall of said housing to provide, when said magazine is operatively positioned within said housing, a processing chamber into which portions of said superposed first and second sheets may be advanced from said pressure-applying rollers during processing, and an exit passage at one end of said chamber opposite said pressure-applying rollers through which portions of said superposed first and second sheets are withdrawn from said chamber.

28. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, exposure means associated with a forward wall of said housing, said magazine comprising a first wall providing a closure for said opening, a pair of laterally spaced dependent walls extending from front to rear of said magazine, the rear portions of said dependent walls providing guide surfaces on which portions of said first sheet are positioned for exposure, a second wall spaced from said first wall and extending between said dependent walls, said second wall being so formed as to mount a supply of said second sheet, an intermediate wall positioned between said first and second walls and extending between said dependent walls, said intermediate wall being so formed as to mount a supply of said first sheet, a dependent rear wall adjacent said guide surfaces, a first pressure-applying member, means for pivotally mounting said first pressure-applying member on said dependent rear wall, a second pressure-applying member, means within said housing for mounting said second pressure-applying member in juxtaposition with said first pressure-applying member when said magazine is in operative position within said housing, said first and second sheets being adapted to be superposed and drawn between said pressure-applying members to release said processing composition for distribution between said first and second sheets, said rear wall of said magazine cooperating with the rear wall of said housing to provide a chamber into which portions of said superposed first and second sheets may be advanced from said pressure-applying members during processing, a door in said rear wall of said housing adapted to be opened to permit removal of portions of said sheets from said chamber, said rear wall of said magazine cooperating with the walls of said housing to prevent the admission of light into the portion of said housing forward of said rear wall and in which said first sheet is mounted and exposed, when said door is open, and an exit passage at the end of said chamber opposite said pressure-applying members through which portions of said first and second sheets are withdrawn from said chamber.

29. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the front wall of said housing, said magazine comprising a first wall providing a closure for said opening, a pair of laterally spaced dependent walls extending from front to rear of said magazine substantially parallel to the walls of said housing, the rear portions of said dependent walls providing guide surfaces on which portions of said first sheet are positioned in the focal surface of said lens, a second wall spaced from said first wall and extending between said dependent walls, said second wall being so formed as to provide a rounded compartment having a rounded opening in one end through one of said dependent walls and being adapted to mount a roll of said second sheet, a portion of said second wall providing a guide member for guiding said second sheet into superposition with said first sheet, an intermediate wall positioned between said second and first walls adjacent the latter and extending between said dependent walls, said intermediate wall being so formed as to provide a rounded compartment having a rounded opening at one end through said one dependent wall and being adapted to mount and house a roll of said first sheet, a dependent rear wall secured at one end to said first wall, a first pressure-applying roller, means for pivotally mounting said first pressure-applying roller on said rear wall adjacent the free end thereof, said guide member and one end of said guide surfaces, a second pressure-applying roller, means within said housing for pivotally mounting said second pressure-applying roller in juxtaposition with said first pressure-applying roller when said magazine is mounted in operative position within said housing, said first and second sheets being adapted to be superposed and drawn between said pressure-applying rollers to release said processing composition for distribution between said first and second sheets, said rear wall of said magazine cooperating with the rear wall of said housing when said magazine is in operative position within said housing, to provide a processing chamber into which portions of said superposed first and second sheets may be advanced from said pressure-applying rollers during processing, and an exit passage at the end of said processing chamber opposite said pressure-applying rollers through which portions of said superposed first and second sheets are withdrawn from said processing chamber.

30. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the front wall of said housing, said magazine comprising a first wall providing a closure for said opening, a pair of laterally spaced dependent walls extending from front to rear of said magazine and substantially parallel to the walls of said housing, the rear portions of said dependent walls providing guide surfaces on which portions of said first sheet are positioned for exposure in the focal surface of said lens, a second wall spaced from said first wall and extending between said dependent walls, said second wall being so formed as to provide a rounded compartment having a rounded opening in one end through one of said dependent walls and being adapted to mount a roll of said second sheet, an intermediate wall positioned between said second and first walls adjacent the latter and extending between said dependent walls, said intermediate wall being so formed as to provide a rounded compartment having a rounded opening in one end through said one dependent wall and being adapted to mount and house a roll of said first sheet, a dependent rear wall secured at one end to said first wall and along one side to the other of said dependent walls, a first pressure-applying roller, means for pivotally mounting said first pressure-applying roller on said dependent rear wall adjacent the free end thereof, portions of said intermediate wall providing means for guiding said first sheet from said roll between said intermediate and first walls onto said guide surfaces, portions of said second wall providing a guide member for guiding said second sheet from its roll into superposition with said first sheet adjacent said first pressure-applying roller, said second wall, together with said intermediate wall and said dependent walls, cooperating to define a passage through which actinic light is transmitted from said lens to portions of said first sheet positioned for exposure on said guide surfaces, a second pressure-applying roller, means within said housing for pivotally mounting said second pressure-applying roller in juxtaposition with said first pressure-applying roller when said magazine is operatively positioned within said housing, said first and second sheets being adapted to be superposed and drawn between said pressure-applying rollers to release said processing composition for distribution between said first and second sheets, said dependent rear wall of said magazine cooperating with the rear wall of said housing to provide, when said magazine is operatively positioned within said housing, a processing chamber into which portions of said superposed first and second sheets may be advanced from said pressure-applying rollers during processing, a door in the rear wall of said housing adapted to be opened to permit removal of portions of said sheets from said chamber, said rear wall of said magazine cooperating with the walls of said housing to prevent admission of light into the portion of said housing forward of said rear wall, and in which said first sheet is mounted and exposed, when said door is open, and an exit passage at the end of said chamber opposite said pressure-applying rollers through which portions of said superposed first and second sheets are withdrawn from said processing chamber.

31. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, exposure means associated with the forward wall of said housing, said magazine comprising a first wall providing a closure for said opening, a pair of laterally spaced dependent walls extending from front to rear of said magazine, the rear portions of said dependent walls providing guide surfaces on which portions of said first sheet are positioned for exposure, a dependent front wall having an aperture through which actinic light is transmitted from said exposure means to portions of said first sheet positioned for exposure on said guide surfaces, a second wall spaced from said first wall and extending between said dependent walls and joined with said dependent forward wall, said second wall being so formed as to mount a supply of said second sheet, an intermediate wall positioned between said first and second walls and extending between said dependent walls and joined with said forward wall, said intermediate wall being so formed as to mount a supply of said first sheet, said lateral dependent walls, together with said second wall and said intermediate wall, defining a passage through which actinic light is transmitted from said aperture in said forward wall to portions of said first sheet positioned for exposure on said guide surfaces, a first pressure-applying member and means for mounting said first pressure-applying member on said magazine, a second pressure-applying member, means within said housing for mounting said second pressure-applying member in juxtaposition with said first pressure-applying member when said magazine is in operative position within said housing, said first and second sheets being adapted to be superposed and drawn between said pressure-applying members to release said processing composition for distribution between said first and second sheets, said magazine having a rear wall adjacent said guide surfaces and cooperating with the rear wall of said housing to provide, when said magazine is operatively positioned within said housing, a chamber into which portions of said superposed first and second sheets may be advanced from said pressure-applying rollers during processing, and an exit passage at the end of said chamber opposite said pressure-applying members through which portions of said first and second sheets are withdrawn from said chamber.

32. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, exposure means associated with the forward wall of said housing, said magazine comprising a first wall providing a closure for said opening, a pair of laterally spaced dependent walls extending from front to rear of said magazine, the rear portions of said dependent walls providing guide surfaces on which portions of said first sheet are positioned for exposure, a dependent front wall having an aperture through which actinic light is transmitted from said exposure means to portions of said first sheet positioned for exposure on said guide surfaces, a second wall spaced from said first wall and extending between said dependent walls and joined with said dependent forward wall, said second wall being so formed as to mount a supply of said second sheet, an intermediate wall positioned between said first and second walls and extending between said dependent walls and joined with said forward wall, said intermediate wall being so formed as to mount a supply of said first sheet, said lateral dependent walls, together with said second wall and said intermediate wall, defining a passage through which actinic light is transmitted from said aperture in said forward wall to portions of said first sheet positioned for exposure on said guide surfaces, a first pressure-applying member and means for mounting said first pressure-applying member on said magazine, a second pressure-applying member, means within said housing for mounting said second pressure-applying member in juxtaposition with said first pressure-applying member when said magazine is in operative position within said housing, said first and second sheets being adapted to be superposed and drawn between said pressure-applying members to release said processing composition for distribution between said first and second sheets, said magazine having a rear wall adjacent said guide surfaces and cooperating with the rear wall of said housing to provide, when said magazine is operatively positioned within said housing, a chamber into which portions of said superposed first and second sheets may be advanced from said pressure-applying rollers during processing, a door in said rear wall of said housing adapted to be opened to permit removal of portions of said sheets from said chamber, said rear wall of said magazine cooperating with the walls of said housing to prevent the admission of light into the portion of said housing forward of said rear wall and in which said first sheet is mounted and exposed, when said door is open, and an exit passage at the end of said chamber opposite said pressure-applying members through which portions of said first and second sheets are withdrawn from said chamber.

33. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the front wall of said housing, said magazine comprising a first wall providing a closure for said opening, a pair of laterally spaced dependent walls extending from front to rear of said magazine substantially parallel to the walls of said housing, the rear portions of said dependent walls providing guide surfaces on which portions of said first sheet are positioned for exposure in the focal surface of said lens, a second wall spaced from said first wall and extending between said dependent walls, said second wall being so formed as to provide a rounded compartment having a rounded opening in one end through one of said dependent walls and being adapted to mount a roll of said second sheet, an intermediate wall positioned between said second and first walls adjacent the latter and extending between said dependent walls, said second wall being so formed as to provide a rounded compartment having a rounded opening at one end through said one dependent wall and being adapted to mount and house a roll of said first sheet, a dependent front wall joining the forward portions of said laterally spaced dependent walls, said second wall and said intermediate wall, said dependent front wall having an aperture in alignment with said lens for transmitting light therethrough, said lateral dependent walls, together with said second wall and said intermediate wall, comprising a passage through which actinic light is transmtted from said lens through said aperture in said forward wall to said portions of said first sheet positioned for exposure on said guide surfaces, a first pressure-applying roller and means for pivotally mounting said first pressure-applying roller on said magazine, a second pressure-applying roller, means within said housing for pivotally mounting said second pressure-applying roller in juxtaposition with said first pressure-applying roller when said magazine is operatively positioned within said housing, said first and second sheets being adapted to be superposed and drawn between said pressure-applying rollers to release said processing composition for distribution between said first and second sheets, said magazine having a rear wall positioned adjacent and cooperating with the rear wall of said housing, when said magazine is in operative position within said housing, to provide a processing chamber into which portions of said superposed first and second sheets may be advanced from said pressure-applying rollers during processing, and an exit passage at the end of said processing chamber opposite said pressure-applying rollers through which portions of said superposed first and second sheets are withdrawn from said processing chamber.

34. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, exposure means associated with the forward wall of said housing, said magazine comprising a first wall providing a closure for said opening, a lateral wall dependent from said first wall, a relatively short forward wall dependent from said first wall and joined substantially at right angles with said lateral wall, said forward wall being provided with an exposure aperture adjacent said exposure means, a rear wall dependent from said first wall and joined at one side to said lateral dependent wall, a second wall spaced from said first wall and joined at one side to said lateral dependent wall and along its forward edge to the lower portion of said forward wall, said second wall being so formed as to mount a supply of said second sheet, an intermediate wall positioned between said second wall and said first wall adjacent the latter, said intermediate wall being so formed as to mount a supply of said first sheet, a lateral third wall generally parallel to said dependent lateral wall, spaced therefrom and extending between and joined with said second wall, said intermediate wall and said forward wall, portions of said lateral wall and said third wall providing guide surfaces adjacent said dependent rear wall on which portions of said first sheet are positioned for exposure, a first pressure-applying member and means for mounting said first pressure-applying member on said dependent rear wall adjacent the free end thereof, a second pressure-applying member, means within said housing for mounting said second pressure-applying member in juxtaposition with said first pressure-applying member when said magazine is in operative position within said housing, said first and second sheets being adapted to be superposed and drawn between said pressure-applying members to release said processing composition for distribution between said first and second sheets, said dependent rear wall being disposed adjacent and cooperating with the rear wall of said housing to provide a processing chamber into which portions of said superposed first and second sheets may be advanced from said pressure-applying members during processing, a door in said rear wall of said housing adapted to be opened to permit removal of portions of said sheets from said chamber, said dependent rear wall cooperating with the walls of said housing to prevent admission of light into the portion of said housing forward of said dependent rear wall and in which said first sheet is mounted and exposed, when said door is open, and an exit passage at the end of said chamber opposite said pressure-applying rollers through which portions of said first and second sheets are withdrawn from said chamber.

35. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the forward wall of said housing, said magazine comprising a generally rectangular first wall providing a closure for said opening, a lateral wall dependent from said first wall, a relatively short forward wall dependent from said first wall and joined substantially at right angles with said lateral dependent wall, said forward wall being provided with an exposure aperture adjacent said lens for transmitting light therethrough, a rear wall dependent from said first wall and joined along one edge to said lateral dependent wall, a second wall spaced from said first wall joined along one side to said lateral dependent wall and along its forward edge to the lower portion of said forward wall, said second wall being so formed as to provide a rounded compartment open at its end and adapted to mount and house a roll of said second sheet, an intermediate wall positioned between said second wall and said first wall adjacent the latter, said intermediate wall being so formed as to provide a rounded compartment open at one end and adapted to mount a roll of said first sheet, a lateral third wall generally parallel to said lateral dependent wall and extending between and joined with said second wall, said intermediate wall and said forward wall, portions of said lateral wall and said third wall providing guide surfaces adjacent said dependent rear wall on which portions of said first sheet are positioned for exposure in the focal surface of said lens, said second wall, together with said intermediate wall, said lateral dependent wall and said third wall, cooperating to provide a passage extending from said forward wall for transmitting actinic light from said aperture therein to portions of said first sheet positioned for exposure on said guide surfaces, a first pressure-applying roller and means for pivotally mounting said first pressure-applying roller on said dependent rear wall adjacent the free end thereof, a second pressure-applying roller, means within said housing for mounting said second pressure-applying roller in juxtaposition with said first pressure-applying roller when said magazine is in operative position within said housing, said first and second sheets being adapted to be superposed and drawn between said pressure-applying rollers to release said processing composition for distribution between said first and second sheets, said dependent rear wall being disposed adjacent and cooperating with the rear wall of said housing to provide, when said magazine is operatively positioned within said housing, a processing chamber into which portions of said superposed first and second sheets may be advanced from said pressure-applying members during processing, and an exit passage at the end of said chamber opposite said pressure-applying rollers through which portions of said first and second sheets are withdrawn from said chamber.

36. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the forward wall of said housing, said magazine comprising a first wall providing a closure for said opening, a lateral wall dependent from said first wall, a relatively short forward wall dependent from said first wall and joined at substantially right angles with said lateral dependent wall, said forward wall being provided with an exposure aperture in alignment with said lens, a rear wall dependent from said first wall and joined along one edge to said lateral dependent wall, a second wall spaced from said first wall and joined along one side to said lateral dependent wall and along its forward edge to the lower portion of said forward wall, said second wall being so formed as to mount a roll of said second sheet, an intermediate wall positioned between said second wall and said first wall adjacent the latter, said intermediate wall being so formed as to mount a roll of said first sheet, a lateral third wall generally parallel to said lateral dependent wall and extending between and joined with said second wall, said intermediate wall and said forward wall, portions of said lateral wall and said third wall providing guide surfaces adjacent said dependent rear wall on which portions of said first sheet are positioned for exposure in the focal surface of said lens, a portion of said second wall being disposed adjacent the free end of said dependent rear wall and providing a passage therebetween, a first pressure-applying roller having stub shafts at its ends on which it may be pivotally mounted in said passage, means for journaling one of said stub shafts in said dependent lateral wall and means secured to said dependent rear wall at its free end for journaling the other of said stub shafts, a second pressure-applying roller, means within said housing for pivotally mounting said second pressure-applying roller in juxtaposition with said first pressure-applying roller when said magazine is operatively positioned within said housing, said first and second sheets being adapted to be superposed and drawn between said pressure-applying members to release said processing composition for distribution between said first and second sheets, said dependent rear wall being disposed adjacent and cooperating with the rear wall of said housing to provide a chamber into which portions of said superposed first and second sheets may be advanced from said pressure-applying rollers during processing, a door in the rear wall of said housing, said door being adapted to be opened to permit removal of portions of said sheets from said processing chamber, said dependent rear wall cooperating with the walls of said housing to prevent the admission of light into the portion of said housing forward of said dependent rear wall, and wherein said first sheet is mounted and exposed, when said door is open, and an exit passage at the end of said chamber opposite said pressure-applying rollers through which portions of said first and second sheets are withdrawn from said chamber.

37. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the forward wall of said housing, said magazine comprising a first wall providing a closure for said opening, a lateral wall dependent from said first wall, a substantially short forward wall dependent from said first wall and joined at substantially right angles with said lateral dependent wall, said forward wall being provided with an exposure aperture in alignment with said lens, a rear wall dependent from said first wall and joined along one edge to said lateral dependent wall, a second wall spaced from said first wall and joined along one side to said lateral dependent wall and along its forward edge to the lower portion of said forward wall, said second wall being so formed as to mount a roll of said second sheet, a portion of said second wall providing a guide member positioned adjacent the free end of said dependent rear wall, an intermediate wall positioned between said second wall and said first wall adjacent the latter, said intermediate wall being so formed as to mount a roll of said first sheet and provide means for guiding said first sheet from said first roll, a lateral third wall generally parallel to said lateral dependent wall and extending between and joined with said second wall, said intermediate wall and said forward wall, portions of said lateral wall and said third wall providing guide surfaces adjacent said dependent rear wall on which portions of said first sheet are positioned for exposure in the focal surface of said lens, portions of said intermediate wall providing means for guiding said first sheet from its roll into contact with said guide surfaces, said second wall, together with said intermediate wall, said lateral dependent wall and said third wall, cooperating to provide a passage extending from said forward wall through which actinic light is transmitted from said aperture to portions of said first sheet positioned for exposure on said guide surfaces, a first pressure-applying roller and means for pivotally mounting said first pressure-applying roller on said dependent rear wall adjacent the free end thereof, the rear surface of said guide member conforming to the curvature of said first pressure-applying roller and being spaced therefrom to provide a narrow curved passage through which said first sheet extends around said first pressure-applying roller, a second pressure-applying roller, means within said housing for pivotally mounting said second pressure-applying roller in juxtaposition with said first pressure-applying roller when said magazine is mounted in operative position within said housing, said guide member being adapted to guide said second sheet from its roll into superposition with said first sheet between said pressure-applying rollers, said first and second sheets being adapted to be drawn in superposition between said pressure-applying rollers to release said processing composition for distribution between said first and second sheets, said dependent rear wall being disposed adjacent and cooperating with the rear wall of said housing to provide a chamber into which portions of said superposed first and second sheets may be advanced from said pressure-applying rollers during processing, a door in the rear wall of said housing, said door being adapted to be opened to permit removal of portions of said sheets from said processing chamber, said dependent rear wall cooperating with the walls of said housing to prevent the admission of light into the portion of said housing forward of said dependent rear wall, and wherein said first sheet is mounted and exposed, when said door is open, and an exit passage at the end of said chamber opposite said pressure-applying rollers through which portions of said first and second sheets are withdrawn from said chamber.

38. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, exposure means associated with a wall of said housing, said magazine comprising a wall providing a closure for said opening, means for mounting supplies of said first and second sheets in said magazine, guide means for positioning portions of said first sheet for exposure, a wall cooperating with the walls of said housing to divide the latter into a lighttight exposure chamber in which said first sheet is mounted and exposed and a processing chamber into which said sheets are advanced during processing, a first pressure-applying member and means for mounting said first pressure-applying member on said magazine, a second pressure-applying member, means within said housing for mounting said second pressure-applying member and for engaging and retaining said first pressure-applying member in juxtaposition with said second pressure-applying member when said magazine is in operative position within said housing, said last-mentioned means being adapted to mount stop means which cooperate with portions of said magazine for arresting movement of said sheets through said camera, means for controlling the operation of said stop means, means for guiding said first and second sheets into superposition between said pressure-applying members, the latter causing the release of said processing composition between said first and second sheets during movement of said sheets between said members, and means providing an exit passage in said processing chamber through which portions of said superposed first and second sheets, advanced from said pressure-applying members into said processing chamber, are removed therefrom.

39. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the forward wall of said housing, said magazine comprising a wall providing a closure for said opening, means for mounting supplies of said first and second sheets in said magazine, guide means for positioning portions of said first sheet for exposure in the focal surface of said lens, a rear wall cooperating with the walls of said housing to divide the latter into a lighttight exposure chamber in which said first sheet is exposed and a processing chamber at the rear of said housing into which said sheets are advanced during processing, a first pressure-applying member and means for mounting said first pressure-applying member on said rear wall, a second pressure-applying member, means within said housing for mounting said second pressure-applying member and for engaging and retaining said first pressure-applying member in juxtaposition with said second pressure-applying member when said magazine is in operative position within said housing, the last-mentioned means including means for mounting stop means adapted to cooperate with portions of said magazine for arresting movement of said sheets through said camera, manually operable means for controlling said stop means, means comprising portions of said magazine for guiding said first and second sheets into superposition between said pressure-applying members, the latter causing the release and distribution of said processing composition between said first and second sheets during movement of said sheets between said members, and means providing an exit passage in said processing chamber through which portions of said superposed first and second sheets, advanced from said pressure-applying members into said processing chamber, are removed therefrom.

40. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the front wall of said housing, said magazine comprising a wall providing a closure for said opening, means for mounting rolls of said first and second sheets on said magazine, means providing guide surfaces on which portions of said first sheet are positioned for exposure in the focal surface of said lens, a rear wall cooperating with the walls of said housing to divide the latter into a lighttight exposure chamber in which said first sheet is mounted and positioned for exposure and a processing chamber at the rear of said housing into which said sheets are advanced during processing, a first pressure-applying roller and means for pivotally mounting said first pressure-applying roller on said magazine at one end of said processing chamber, a second pressure-applying roller, means within said housing for mounting said second pressure-applying roller and for engaging and retaining said first pressure-applying roller in juxtaposition with said second pressure-applying roller when said magazine is in operative position within said housing, a stop mechanism mounted on the last-mentioned means and adapted to cooperate with portions of said magazine for arresting movement of said sheets through said camera, means for controlling the operation of said stop mechanism, means for guiding said first and second sheets into superposition between said pressure-applying rollers, the latter effecting the release and distribution of said processing composition between said first and second sheets during movement of said sheets between said rollers, and means providing an exit passage in the end of said processing chamber opposite said pressure-applying rollers and through which portions of said superposed first and second sheets, advanced from said pressure-applying rollers into said processing chamber, are removed therefrom.

41. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the front wall of said housing, said magazine comprising a first wall providing a closure for said opening, a second wall spaced from said first wall and so formed as to provide a rounded compartment adapted to house a roll of said second sheet, an intermediate wall positioned adjacent said first wall between the latter and said second wall, said intermediate wall being so formed as to provide a rounded compartment adapted to mount and house a roll of said first sheet, means connecting said first and intermediate walls and providing guide surfaces on which portions of said first sheet are positioned in the focal surface of said lens, a dependent rear wall secured at one end to said first wall and having its other end free, said rear wall cooperating with the walls of said housing to divide the latter into a lighttight exposure chamber in which said first sheet is mounted and positioned for exposure and a processing chamber at the rear of said housing into which said sheets are advanced during processing, a first pressure-applying roller and means for pivotally mounting said first pressure-applying roller on said dependent rear wall adjacent the end thereof and one end of said processing chamber, a second pressure-applying roller, means within said housing for mounting said second pressure-applying roller and for engaging and retaining said first pressure-applying roller in juxtaposition with said second pressure-applying roller when said magazine is in operative position within said housing, the last-mentioned means being adapted to mount a stop mechanism adapted to cooperate with portions of said second wall of said magazine for arresting movement of said sheets through said camera, means for controlling the operation of said stop mechanism, said portions of said second wall, together with portions of said intermediate wall, providing means for guiding said first and second sheets into superposition between said pressure-applying rollers, said first and second sheets being adapted to be drawn between said rollers to release said processing composition for distribution between said first and second sheets, and means providing an exit passage in the end of said processing chamber opposite said pressure-applying rollers and through which portions of said superposed first and second sheets, advanced from said pressure-applying rollers into said processing chamber, are removed therefrom.

42. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the front wall of said housing, said magazine comprising a first wall providing a closure for said opening, a pair of laterally spaced dependent walls extending from front to rear of said magazines, means secured between said dependent walls for mounting rolls of said first and second sheets on said magazine, portions of said dependent walls providing guide surfaces on which portions of said first sheet are positioned in the focal surface of said lens, a dependent rear wall secured at one end to said first wall, said rear wall cooperating with the walls of said housing to divide the latter into a lighttight exposure chamber forward of said rear wall and in which said first sheet is mounted and positioned for exposure and a processing chamber at the rear of said housing and into which said sheets are advanced during processing, a first pressure-applying roller and means for pivotally mounting said first pressure-applying roller on said dependent rear wall adjacent the free end thereof at one end of said processing chamber, a second pressure-applying roller, means within said housing for pivotally mounting said second pressure-applying roller and for engaging and retaining said first pressure-applying roller in juxtaposition with said second pressure-applying roller when said magazine is in operative position within said housing, the last-mentioned means being adapted to mount a stop mechanism adapted to cooperate with portions of said magazine for arresting movement of said sheets through said camera, means for guiding said first and second sheets into superposition between said pressure-applying rollers, the latter releasing and distributing said processing composition between said first and second sheets during movement of said sheets between said rollers, and means providing an exit passage in the end of said processing chamber opposite said pressure-applying rollers and through which portions of said superposed first and second sheets, advanced from said pressure-applying rollers into said processing chamber, are removed therefrom.

43. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the forward wall of said housing, said magazine including a first wall providing a closure for said opening, a pair of laterally spaced dependent walls extending from front to rear of said magazine, means secured between said dependent walls for mounting rolls of said first and second sheets on said magazine, the rear portions of said dependent walls providing guide surfaces on which portions of said first sheet are positioned in the focal surface of said lens, a dependent front wall joining with said lateral walls, said dependent front wall including an aperture positioned adjacent said lens and adapted to transmit actinic light from said lens to portions of said first sheet positioned on said guide surfaces, a dependent rear wall secured at one end to said first wall, said rear wall cooperating with the walls of said housing to divide the latter into a lighttight exposure chamber forward of said rear wall and in which said first sheet is mounted and positioned for exposure and a processing chamber at the rear of said housing and into which said sheets are advanced during processing, a first pressure-applying roller and means for pivotally mounting said first pressure-applying roller on said dependent rear wall adjacent the free end thereof at one end of said processing chamber, a second pressure-applying roller, means within said housing for mounting said second pressure-applying roller and for engaging and retaining said first pressure-applying roller in juxtaposition with said second pressure-applying roller when said magazine is in operative position within said housing, the last-mentioned means being adapted to mount a stop mechanism adapted to cooperate with portions of said magazine for arresting movement of said sheets through said camera, means for guiding said first and second sheets into superposition between said pressure-applying rollers, the latter being adapted to release said processing composition for distribution between said first and second sheets during movement of said sheets between said rollers, and means providing an exit passage in the end of said processing chamber opposite said pressure-applying rollers and through which portions of said superposed first and second sheets, advanced from said pressure-applying rollers into said processing chamber, are removed therefrom.

44. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the front wall of said housing, said magazine comprising a first wall providing a closure for said opening, a pair of laterally spaced dependent walls extending from front to rear of said magazine substantially parallel to the walls of said housing, the rear portions of said dependent walls providing guide surfaces on which portions of said first and second sheets are positioned for exposure in the focal surface of said lens, a second wall spaced from said first wall and extending between said dependent walls, said second wall being so formed as to mount a roll of said second sheet, an intermediate wall positioned between said second and first walls adjacent the latter and extending between said dependent walls, said intermediate wall being so formed as to mount a roll of said first sheet, a dependent rear wall secured at one end to said first wall, said rear wall cooperating with the walls of said housing to divide the latter into lighttight exposure chamber forward of said rear wall and in which said first sheet is mounted and positioned for exposure and a processing chamber at the rear of said housing and into which said sheets are advanced during processing, a first pressure-applying roller and means for pivotally mounting said first pressure-applying roller on said dependent rear wall adjacent the free end thereof at one end of said processing chamber, a second pressure-applying roller, means within said housing for mounting said second pressure-applying roller and for engaging and retaining said first pressure-applying roller in juxtaposition with said second pressure-applying roller when said magazine is in operative position within said housing, the last-mentioned means being adapted to mount a stop mechanism adapted to cooperate with portions of said magazine for arresting movement of said sheets through said camera, means for guiding said first and second sheets into superposition between said pressure-applying rollers, the latter releasing said processing composition for distribution between said first and second sheets during movement of said sheets between said rollers, and means providing an exit passage in the end of said processing chamber opposite said pressure-applying rollers and through which portions of said superposed first and second sheets, advanced from said pressure-applying rollers into said processing chamber, are removed therefrom.

45. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the front wall of said housing, said magazine comprising a first wall providing a closure for said opening, a lateral wall dependent from said first wall, a relatively short forward wall dependent from said first wall and joined substantially at right angles with said lateral wall, said forward wall being provided with an exposure aperture adjacent said lens, a rear wall dependent from said first wall and joined at one side to said lateral dependent wall, said rear wall cooperating with the walls of said housing to divide the latter into a lighttight exposure chamber forward of said rear wall and in which said first sheet is mounted and positioned for exposure and a processing chamber at the rear of said housing and into which said sheets are advanced during processing, a second wall spaced from said first wall and joined at one side to said lateral dependent wall and along its forward edge to the lower portion of said forward wall, said second wall being so formed as to mount a supply of said second sheet, an intermediate wall positioned between said second wall and said first wall adjacent the latter, said intermediate wall being so formed as to mount a supply of said first sheet, a lateral third wall generally parallel to said dependent lateral wall and spaced therefrom and extending between and joined with said second wall, said intermediate wall and said forward wall, portions of said lateral wall and said third wall providing guide surfaces adjacent said dependent rear wall and on which portions of said first sheet are positioned for exposure in the focal surface of said lens, a first pressure-applying roller and means for pivotally mounting said first pressure-applying roller on said dependent rear wall adjacent the free end thereof, a second pressure-applying roller, means within said housing for mounting said second pressure-applying roller and for engaging and retaining said first pressure-applying roller in juxtaposition with said second pressure-applying roller when said magazine is in operative position within said housing, the last-mentioned means mounting a stop mechanism adapted to cooperate with portions of said second wall for arresting movement of said sheets through said camera, means for controlling the operation of said stop mechanism, portions of said second and intermediate walls providing means for guiding said first and second sheets into superposition between said pressure-applying rollers, the latter releasing said processing composition for distribution between said first and second sheets during movement of said sheets between said rollers, and means providing an exit passage at the end of said processing chamber opposite said pressure-applying rollers and through which portions of said first and second sheets, advanced from said pressure-applying rollers into said chamber, are removed therefrom.

46. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the front wall of said housing, said magazine comprising a wall providing a closure for said opening, means for mounting rolls of said first and second sheets on said magazine, means providing guide surfaces on which portions of said first sheet are positioned in the focal surface of said lens, a rear wall cooperating with the walls of said housing to divide the latter into a lighttight exposure chamber in which said first sheet is mounted and positioned for exposure and a processing chamber at the rear of said housing and into which said sheets are advanced during processing, a first pressure-applying roller and means for pivotally mounting said first pressure-applying roller on said magazine at one end of said processing chamber, a second pressure-applying roller, means within said housing for pivotally mounting said second pressure-applying roller, the last-mentioned means including members adapted to engage portions of said first pressure-applying roller to retain the latter in juxtaposition with said second pressure-applying roller when said magazine is in operative position within said housing, means for urging said second pressure-applying roller toward said first pressure-applying roller, stop means cooperating with portions of said magazine for arresting movement of said sheets through said camera, means for controlling the operation of said stop means, means for guiding said first and second sheets into superposition with said pressure-applying rollers, the latter releasing said processing composition for distribution between said first and second sheets during movement of said sheets between said rollers, and means providing an exit passage in the end of said processing chamber opposite said pressure-applying rollers and through which portions of said superposed first and second sheets, advanced from said pressure-applying rollers into said processing chamber, are removed therefrom.

47. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the front wall of said housing, said magazine comprising a wall providing a closure for said opening, means for mounting rolls of said first and second sheets on said magazine, means providing guide surfaces on which portions of said first sheet are positioned for exposure in the focal surface of said lens, a dependent rear wall cooperating with the walls of said housing to divide the latter into a lighttight exposure chamber forward of said wall and in which said first sheet is mounted and positioned for exposure and a processing chamber at the rear of said housing and into which said sheets are advanced during processing, a first pressure-applying roller having stub shafts at its ends on which it is pivotally mounted, means secured to said rear wall adjacent the end thereof and one end of said processing chamber adapted to journal said stub shafts, a second pressure-applying roller, frame means secured within said housing at one end of said processing chamber for pivotally mounting said second pressure-applying roller, said frame means including members having portions adapted to engage said stub shafts and retain said first roller in juxtaposition with said second roller when said magazine is in operative position within said housing, spring means secured to said frame means for urging said second roller toward said first roller, a resilient stop member mounted on said frame means and adapted to cooperate with a portion of said magazine for arresting movement of said sheets through said camera, means for controlling the operation of said stop member, means for guiding said first and second sheets into superposition with said pressure-applying rollers, the latter releasing said processing composition for distribution between said first and second sheets during movement of said sheets between said rollers, and means providing an exit passage in the end of said processing chamber opposite said pressure-applying rollers and through which portions of said superposed first and second sheets, advanced from said pressure-applying rollers into said processing chamber, are removed therefrom.

48. A camera of the type wherein a first sheet of photosensitive material is exposed and thereafter processed in conjunction with a second sheet by a liquid processing composition releasably carried by one of said sheets, said camera comprising, in combination, a housing having an opening in one side providing a passage, a magazine mounted within said housing removable through said passage, lens and shutter means associated with the front wall of said housing, said magazine comprising a first wall providing a closure for said opening, a pair of laterally spaced dependent walls extending from front to rear of said magazine and being disposed adjacent the walls of said housing, means secured between said dependent walls for mounting rolls of said first and second sheets on said magazine, portions of said dependent walls providing guide surfaces on which portions of said first sheet are positioned for exposure in the focal surface of said lens, a dependent rear wall secured at one end to said first wall, said rear wall cooperating with the walls of said housing to divide the latter into a lighttight exposure chamber forward of said rear wall and in which said first sheet is mounted and positioned for exposure and a processing chamber at the rear of said housing and into which said sheets are advanced during processing, a first pressure-applying roller having stub shafts at its ends on which it is pivotally mounted, means secured to one of said dependent walls and said rear wall adjacent the end thereof adapted to journal said stub shafts, the latter extending from said journal means between said lateral dependent walls and the walls of said housing, a second pressure-applying roller, a U-shaped frame member secured within said housing at one end of said processing chamber, said frame member having arms adapted to pivotally mount said second pressure-applying roller, portions of said arms extending between said lateral dependent walls and the walls of said housing being adapted to engage and so retain the ends of said stub shafts that said first pressure-applying roller is retained in juxtaposition with said second pressure-applying roller when said magazine is operatively positioned within said housing, spring means secured to said frame member for urging said second roller toward said first roller, said rollers releasing said processing composition for distribution between said first and second sheets during movement of said sheets between said rollers, a resilient stop member mounted on said frame member and adapted to cooperate with a portion of said magazine for arresting movement of said sheets through said camera, and means for controlling the operation of said stop member.

49. A camera of the type through which sheet material is advanced and comprising, in combination, a housing having an opening in one side, a magazine within said housing removable through said opening and providing a closure therefor, said magazine comprising means for mounting supplies of photosensitive and second sheets, means for positioning frames of said photosensitive sheet for exposure, means for guiding said photosensitive and second sheets into superposition, support means for positioning and supporting portions of said second sheet and a dependent wall cooperating with the walls of said housing to divide the latter into a lighttight exposure chamber in which said photosensitive and second sheets are mounted and said photosensitive sheet is exposed and a processing chamber into which said sheets are advanced during processing, a first pressure-applying member mounted on said dependent wall adjacent one end thereof and one end of said processing chamber, a second pressure-applying member, a novel mounting device secured within said housing at said one end of said processing chamber, said device including means for mounting said second pressure-applying member and engaging said first pressure-applying member so as to retain said pressure-applying members in juxtaposition with one another when said magazine is operatively positioned within said housing, said photosensitive and second sheets being adapted to be advanced in superposition between said pressure-applying members to effect the distribution of a processing composition between said sheets, stop means for arresting movement of said sheets through said camera, said stop means comprising a single resilient element having end portions normally urged into engagement with portions of said second sheet positioned on said support member, said mounting device mounting said resilient element for movement from an operative position in engagement with said sheet to an inoperative position, and manually operable means for inoperatively positioning said resilient element.

50. A camera of the type through which sheet material is advanced and comprising, in combination, a housing having an opening in one side, a magazine within said housing removable through said opening and providing a closure therefor, said magazine comprising means for mounting supplies of first and second sheets, means for positioning portions of said first sheet for exposure, means for guiding said first and second sheets into superposition, support means for positioning and supporting portions of said second sheet and a dependent wall cooperating with the walls of said housing to divide the latter into a lighttight exposure chamber in which said first and second sheets are mounted and said first sheet is exposed and a processing chamber into which said sheets are advanced during processing, a first pressure-applying roller pivotally mounted on said dependent wall adjacent the free end thereof and one end of said processing chamber, a second pressure-applying roller, a U-shaped frame secured within said housing at said one end of said processing chamber, said frame having arms pivotally mounting said second pressure-applying roller, portions of said arms engaging said first pressure-applying roller so as to retain said pressure-applying rollers in juxtaposition with one another when said magazine is operatively positioned within said housing, said first and second sheets being adapted to be drawn between said pressure-applying rollers in superposed relation to effect the spreading, between said sheets, of a processing composition releasably carried by one of said sheets, stop means for arresting movement of said sheets through said camera, said stop means comprising a single resilient element mounted on said frame and having end portions normally urged into engagement with portions of said second sheet positioned on said support member, said frame so mounting said resilient element that said end portions are movable from an operative position in engagement with said sheet to an inoperative position, and manually operable means for inoperatively positioning said end portions of said resilient element.

51. A camera of the type wherein a first sheet of photosensitive material is exposed and thereafter processed in conjunction with a second sheet by a liquid processing composition releasably carried by one of said sheets, said camera comprising, in combination, a housing having an opening in one side, a magazine within said housing removable through said opening and provided a closure therefor, said magazine comprising means for mounting supplies of said first and second sheets, means for positioning portions of said first sheet for exposure, means for guiding said first and second sheets into superposition, support members for positioning and supporting portions of said second sheet and a dependent wall cooperating with the walls of said housing to divide the latter into a lighttight exposure chamber in which said first and second sheets are mounted and said first sheet is exposed and a processing chamber into which said sheets are advanced during processing, a first pressure-applying roller, means for pivotally mounting said first pressure-applying roller on said dependent wall adjacent the free end thereof at one end of said processing chamber, a second pressure-applying roller, a U-shaped frame, having a transverse base portion and two generally parallel arms, secured within said housing at said one end of said processing chamber, said arms having inwardly extending brackets adapted to pivotally mount said second pressure-applying roller for movement toward and away from said first roller, spring means secured to said transverse base portion of said frame adapted to engage and urge said second roller toward said first roller, said arms including means adapted to engage and retain portions of said first pressure-applying roller so as to juxtapose said first and second rollers when said magazine is in operative position within said housing, said first and second sheets being adapted to be drawn between said pressure-applying rollers in superposed relation to effect the distribution of said processing composition between said sheets, stop means for arresting movement of said sheets through said camera, said stop means comprising a single resilient stop member having a U-shaped base portion the arms of which are formed into coils and have two free end portions, said stop member being secured at its U-shaped base portion to said transverse base portion of said frame so that said coils are biased toward said support member and said end portions extend toward said support member substantially parallel to each other, said arms having inwardly extending brackets providing slots through which said end portions of said stop member project toward said support member and portions of said second sheet positioned thereon, said slots being so formed as to permit limited movement of each of said end portions in a plurality of directions at least one of which is generally perpendicular to the direction of advancement of said second sheet from said support member and another of which is generally parallel to the direction of advancement of said second sheet, said end portions normally being biased by said coils toward said second sheet in a direction opposite the direction of advancement of said second sheet, and manually operable means for moving said coils, including said end portions, out of engagement with said second sheet.

52. A camera of the type wherein a first sheet of photosensitive material is exposed and thereafter processed in conjunction with a second sheet by a liquid processing composition releasably carried by one of said sheets, said camera comprising, in combination, a housing having an opening in one side, a magazine within said housing removable through said opening and providing a closure therefor, said magazine comprising means for mounting supplies of said first and second sheets, means for positioning portions of said first sheet for exposure, means for guiding said first and second sheets into superposition, support means for positioning and supporting portions of said second sheet and a dependent wall cooperating with the walls of said housing to divide the latter into a lighttight exposure chamber in which said first and second sheets are mounted and said first sheet is exposed and a processing chamber into which said sheets are advanced during processing, a first pressure-applying roller having stub shafts at its ends on which said roller is pivotally mounted, journal means secured to said dependent wall for pivotally mounting said first roller on said stub shafts adjacent the free end of said dependent rear wall at one end of said exposure chamber, a second pressure-applying roller, a U-shaped frame, having a transverse base section and two arms extending therefrom, secured within said housing at said one end of said processing chamber, said arms having inwardly extending brackets adapted to pivotally mount said pressure-applying roller for movement toward and away from said first pressure-applying roller, a torsion spring secured to said base section of said frame and having end portions adapted to engage and urge said second roller toward said first roller, said arms including slots adapted to engage and retain said stub shafts so as to juxtapose said first and second rollers when said magazine is in operative position within said housing, said first and second sheets being adapted to be drawn between said pressure-applying rollers to release said processing composition for distribution between said sheets, stop means for arresting movement of said sheets through said camera, said stop means comprising a single torsion spring having two end portions extending in the same direction toward said support member, said torsion spring being secured to said transverse base section of said frame, said arms having inwardly extending brackets providing slots through which said end portions of said torsion spring project toward said support member and portions of said second sheet positioned thereon, said slots being so formed as to permit limited movement of each of said end portions in a plurality of directions at least one of which is generally perpendicular to the direction of advancement of said second sheet on said support member and another of which is generally parallel to the direction of advancement of said second sheet, said end portions of said torsion spring being normally biased toward said second sheet in a direction opposite the direction of advancement of said second sheet, and manually operable means for moving said torsion spring, including said end portions, out of engagement with said second sheet.

53. A camera of the type wherein a first sheet of photosensitive material is exposed and thereafter processed in conjunction with a second sheet by a liquid processing composition releasably carried by one of said sheets, said camera comprising, in combination, a housing having an opening in one side, a magazine within said housing removable through said opening and providing a closure therefor, said magazine comprising means for mounting supplies of said first and second sheets, means for positioning portions of said first sheet for exposure, means for guiding said first and second sheets into superposition, support means for positioning and supporting portions of said second sheet and a dependent wall cooperating with the walls of said housing to divide the latter into a lighttight exposure chamber in which said first and second sheets are mounted and said first sheet is exposed and a processing chamber into which said sheets are advanced during processing, a first pressure-applying roller, means for pivotally mounting said first pressure-applying roller on said dependent wall adjacent the free end thereof and one end of said processing chamber, a second pressure-applying roller, a U-shaped frame, having a transverse base section and a pair of generally parallel arms extending therefrom, secured within said housing at said one end of said processing chamber, said arms including means for pivotally mounting said second pressure-applying roller with its axis parallel to the axis of said first pressure-applying roller, spring means secured to said base section and adapted to urge said second pressure-applying roller toward said first pressure-applying roller, said arms including means adapted to engage and so retain said first rollers as to juxtapose said first and second rollers when said magazine is in operative position within said housing, said first and second sheets being adapted to be drawn between said pressure-applying rollers to release said processing composition for distribution between said sheets, stop means for arresting movement of said sheets through said camera, said stop means comprising a spring having a transverse portion secured to said base section of said frame, two torsion coils extending from said transverse portion substantially in alignment and with their axes parallel to the axis of said second roller and two free end portions extending generally parallel to one another toward said support member, said arms having inwardly extending brackets providing a slotted passage through which said end portions of said spring project toward said support member and portions of said second sheet positioned thereon, said passage being so formed as to permit limited movement of each of said end portions in a plurality of directions at least one of which is generally perpendicular to the direction of advancement of and the plane of said second sheet positioned on said support member and another of which is generally parallel to the direction of advancement of said second sheet, said torsion coils, together with said end portions of said spring, normally being biased toward said support member, said torsion coils biasing said end portions in a direction substantially opposite the direction of advancement of said second sheet on said support member, and manually operable means including a member adapted to engage said torsion coils and movable so as to withdraw said end portions from engagement with said second sheet to permit further advancement of said second sheet.

References Cited in the file of this patent
UNITED STATES PATENTS

| | | |
|---|---|---|
| 2,455,111 | Carbone | Nov. 30, 1948 |
| 2,681,602 | Fairbanks | June 22, 1954 |